(12) United States Patent
Sakata

(10) Patent No.: US 12,187,199 B2
(45) Date of Patent: Jan. 7, 2025

(54) ELECTRIC RETRACTION UNIT, ELECTRICALLY RETRACTABLE PERIPHERAL VISIBILITY DEVICE FOR VEHICLE

(71) Applicant: MISATO INDUSTRIES CO., LTD., Fujioka (JP)

(72) Inventor: Ikuo Sakata, Isehara (JP)

(73) Assignee: MISATO INDUSTRIES CO., LTD., Fujioka (JP)

( * ) Notice: Subject to any disclaimer, the term of this patent is extended or adjusted under 35 U.S.C. 154(b) by 127 days.

(21) Appl. No.: 17/766,978

(22) PCT Filed: Oct. 5, 2020

(86) PCT No.: PCT/JP2020/037718
§ 371 (c)(1),
(2) Date: Apr. 6, 2022

(87) PCT Pub. No.: WO2021/070776
PCT Pub. Date: Apr. 15, 2021

(65) Prior Publication Data
US 2024/0075877 A1    Mar. 7, 2024

(30) Foreign Application Priority Data
Oct. 7, 2019   (JP) ................................. 2019-184510

(51) Int. Cl.
*B60R 1/26* (2022.01)
*B60R 1/074* (2006.01)

(52) U.S. Cl.
CPC ................ *B60R 1/26* (2022.01); *B60R 1/074* (2013.01); *B60R 2300/105* (2013.01); *B60R 2300/20* (2013.01)

(58) Field of Classification Search
None
See application file for complete search history.

(56) References Cited

U.S. PATENT DOCUMENTS 10,797,558 B2 * 10/2020 Motomiya ........... H02K 7/1166
2012/0134039 A1    5/2012 Sakata

FOREIGN PATENT DOCUMENTS

| EP | 2 457 771 A1 | 5/2012 |
|----|--------------|--------|
| JP | 2018-192892 A | 12/2018 |

OTHER PUBLICATIONS

International Search Report mailed on Dec. 1, 2020 in PCT/JP2020/037718 filed on Oct. 5, 2020, 2 pages.
Extended European Search Report issued Oct. 2, 2023, in corresponding European Patent Application No. 20874753.5, 8 pages.

* cited by examiner

*Primary Examiner* — Jennifer D. Carruth
(74) *Attorney, Agent, or Firm* — Oblon, McClelland, Maier & Neustadt, L.L.P.

(57) ABSTRACT

A visibility assembly includes a base, a shaft, and the visibility assembly. The visibility assembly includes a housing, a visibility unit, and an electric retraction unit. The electric retraction unit includes a shaft, casings, a motor and a deceleration mechanism, and a holding member. The casings are configured of a member higher in stiffness than the holding member. The holding member is configured of an elastic member. The visibility assembly is able to rotate smoothly.

11 Claims, 14 Drawing Sheets

ELECTRIC RETRACTION UNIT, ELECTRICALLY RETRACTABLE PERIPHERAL VISIBILITY DEVICE FOR VEHICLE

TECHNICAL FIELD

The present invention relates to an electric retraction unit mounted on an electrically retractable peripheral visibility device for a vehicle. The present invention relates also to an electrically retractable peripheral visibility device for a vehicle equipped with an electric retraction unit.

BACKGROUND ART

An example of an electric retraction unit and an electrically retractable peripheral visibility device for a vehicle includes those disclosed in PTL 1.

A visibility device for a vehicle in PTL 1 includes a stay fixed to a vehicle door, a retraction mechanism supported by the stay, a camera supported by a pivot body of the retraction mechanism, and a monitor installed in the vehicle. The retraction mechanism of the visibility device for a vehicle in PTL 1 includes a support shaft, a case and a cover of the pivot body pivotably supported by the support shaft, and a motor and a deceleration mechanism of a drive mechanism accommodated in the case and the cover.

The visibility device for a vehicle in PTL 1 is designed to display an image captured by the camera on the monitor. The visibility device for a vehicle in PTL 1 is configured such that when the motor is driven, the pivot body is pivoted toward a vehicle rear side from a standing (developing, returning) position relative to the stay, and is pivoted from the vehicle rear side to the standing position In such a visibility device for a vehicle (an electric retraction unit and an electrically retractable peripheral visibility device for a vehicle), it is preferable that the pivot body (casings and a visibility assembly) is smoothly rotated in a stable state.

CITATION LIST

Patent Literature

PTL 1: Japanese Unexamined Patent Application Publication No. 2018-192892

SUMMARY OF THE INVENTION

Problems to be Solved by the Invention

However, the visibility device for a vehicle of PTL 1 is configured to directly accommodate the main body part of the motor between a lower restriction part of the case and an upper restriction part of the cover, and thus, a backlash may occur between the motor, and the case and the cover. As a result, the visibility device for a vehicle of PTL 1 may not be able to smoothly rotate the pivot body in a stable state.

A problem to be solved by the present invention is to provide an electric retraction unit and an electrically retractable peripheral visibility device for a vehicle, by which it is possible to smoothly rotate a pivot body (casings and a visibility assembly) in a stable state.

Means for Solving the Problem

An electric retraction unit according to the present invention is an electric retraction unit mounted on an electrically retractable peripheral visibility device for a vehicle, and includes a shaft fixed to a vehicle body via a base, casings rotatably attached to the shaft, and a motor, a deceleration mechanism, and a holding member accommodated in the casings, in which the deceleration mechanism includes a gear having a shaft part being attached to a drive shaft of the motor, the motor and the gear are held by the holding member, the holding member is configured of an elastic member and held by the casings, and includes a gear holding part configured to rotatably hold the shaft part of the gear, and the casings are configured by a member higher in stiffness than the holding member, and includes a receiving part configured to receive a thrust load of the shaft part of the gear on a side of the motor.

In the electric retraction unit according to the present invention, it is preferable that a portion adjacent to the gear holding part of the holding member is provided with an insertion hole into which a part of the casings is inserted.

In the electric retraction unit according to the present invention, it is preferable that the motor includes a main body part, a tubular part provided on one surface of the main body part, the drive shaft rotatably protruding from the tubular part, and an end cap part provided on the other surface, on a side opposite to the one surface, of the main body part, and the holding member includes a motor first fitting and holding part configured to fit and hold the tubular part from outside, a motor second fitting and holding part configured to fit and hold the end cap part from outside, and a plurality of motor ribs provided on an inner surface of the motor first fitting and holding part facing the tubular part and an inner surface of the motor second fitting and holding part facing the end cap part.

In the electric retraction unit according to the present invention, it is preferable that the gear of the deceleration mechanism has one end provided with a first shaft part of the shaft part and the other end provided with a second shaft part, the first shaft part is attached to the drive shaft of the motor, and the holding member includes a gear first holding part of the gear holding part configured to rotatably hold the first shaft part of the gear, and a gear second holding part configured to rotatably hold the second shaft part of the gear.

In the electric retraction unit according to the present invention, it is preferable that the motor includes a main body part, a tubular part provided on one surface of the main body part, the drive shaft rotatably protruding from the tubular part, and an end cap part provided on the other surface, on a side opposite to the one surface, of the main body part, the gear of the deceleration mechanism has one end provided with a first shaft part of the shaft part and the other end provided with a second shaft part, the first shaft part is attached to the drive shaft of the motor, the holding member includes a motor first fitting and holding part configured to fit and hold the tubular part from outside, a motor second fitting and holding part configured to fit and hold the end cap part from outside, a plurality of motor ribs provided on an inner surface of the motor first fitting and holding part facing the tubular part and an inner surface of the motor second fitting and holding part facing the end cap part, a gear first holding part of the gear holding part configured to rotatably hold the first shaft part of the gear, and a gear second holding part configured to rotatably hold the second shaft part of the gear, and the gear first holding part of the holding member, the gear second holding part, and the motor first fitting and holding part are configured of one component, and form a hollow tubular shape housing the gear, the drive shaft, and the tubular part.

In the electric retraction unit according to the present invention, it is preferable that the casings include a fitting and holding part configured to fit and hold the holding member, and the holding member includes a fitted and held part fitted and held by the fitting and holding part and at least one casing rib provided on a surface of the fitted and held part facing the fitting and holding part.

In the electric retraction unit according to the present invention, it is preferable that the deceleration mechanism includes a first worm gear being the gear, a second worm gear having a shaft part being rotatably held by the casings, and an intermediate gear being fixed to the shaft part of the second worm gear and meshing with the first worm gear, the holding member includes a pair of gear fitting and holding part arranged on both sides of the intermediate gear, and the pair of gear fitting and holding parts are each provided with a circular through hole configured to rotatably fit and hold the shaft part of the second worm gear.

In the electric retraction unit according to the present invention, it is preferable to include a clutch mechanism being attached to the casings (6U, 6D), the clutch mechanism being in an engaged state in normal times, the clutch mechanism configured to transmit a rotational force of the motor to the casings (6U, 6D) via the deceleration mechanism, the clutch mechanism in a disengaged state if a force larger than the rotational force transmitted from the motor is applied to the casings to not transmit the force from the casings to the deceleration mechanism and to rotate the casings, a rotational force transmission mechanism being attached to the shaft, the rotational force transmission mechanism configured to transmit the rotational force of the motor via the deceleration mechanism and the clutch mechanism to the casings to rotate the casings between a first position and a second position, and a stopper mechanism configured to stop the casings at each of the first position and the second position, in a plan view from top to bottom, the clutch mechanism is arranged between the rotational force transmission mechanism and the motor, and an arrangement direction of the rotational force transmission mechanism, the clutch mechanism, and the motor intersects with a direction of the drive shaft of the motor.

An electrically retractable peripheral visibility device for a vehicle according to the present invention includes the electric retraction unit according to the present invention, a base fixed to a vehicle body, a shaft of the electric retraction unit fixed to the base, and a visibility assembly rotatably attached to the shaft in which the visibility assembly includes a housing, a visibility unit accommodated in the housing together with the electric retraction unit, and the visibility assembly is rotated by the electric retraction unit between a use position and a rear retraction position.

In the electrically retractable peripheral visibility device for a vehicle according to the present invention, it is preferable that the visibility unit is an imaging device configured to image a periphery of a vehicle.

The electrically retractable peripheral visibility device for a vehicle according to the present invention preferably includes a display device mounted in the vehicle and configured to display an image around the vehicle imaged by the imaging device.

Effect of the Invention

In an electric retraction unit and an electrically retractable peripheral visibility device for a vehicle according to the present invention, it is possible to smoothly rotate a pivot body (casings and a visibility assembly) in a stable state.

BRIEF DESCRIPTION OF THE DRAWINGS

FIG. 4 is a perspective view illustrating the visibility assembly, a base, and the like.

FIG. 14(A) is a plan view illustrating the holding member. FIG. 14(B) is a left side view illustrating the holding member. FIG. 14(C) is a front view illustrating the holding member. FIG. 14(D) is a right side view illustrating the holding member. FIG. 14(E) is a rear view illustrating the holding member. FIG. 14(F) is a bottom view illustrating the holding member.

FIG. 17(A) is a schematic plan view illustrating an arrangement state obtained when an arrangement direction of the rotational force transmission mechanism, the clutch mechanism, and the motor intersects with a drive shaft direction of the motor. FIG. 17(B) is a schematic plan view illustrating an arrangement state obtained when an arrangement direction of the rotational force transmission mechanism, the clutch mechanism, and the motor is parallel to a drive shaft direction of the motor.

MODE FOR CARRYING OUT THE INVENTION

Figure 1:
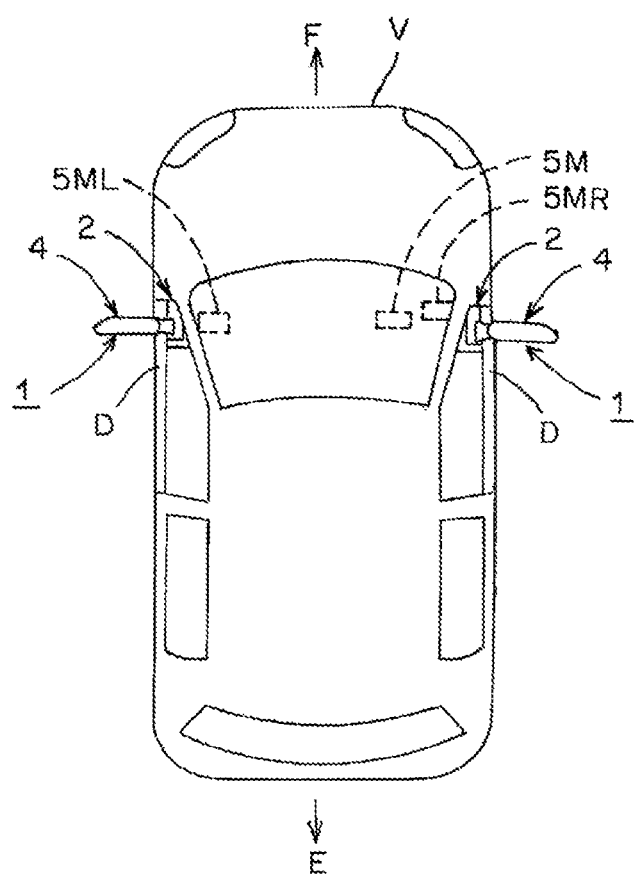
FIG. 1 is a plan view of a usage state illustrating an embodiment of an electric retraction unit and an electrically retractable peripheral visibility device for a vehicle according to the present invention.

An example of an embodiment (working example) of an electric retraction unit and an electrically retractable peripheral visibility device for a vehicle according to the present invention will be described below based on the drawings. In the specification and the claims on the attached sheet, front, rear, upper, lower, left, and right are defined as front, rear, upper, lower, left, and right when the electrically retractable peripheral visibility device for a vehicle according to the present invention is mounted on a vehicle. Since the drawings are schematic views, main parts are illustrated, parts other than the main parts are omitted, and hatching is partially omitted.

Description of Configuration of Embodiment

Configurations of the electric retraction unit and the electrically retractable peripheral visibility device for a vehicle according to the present embodiment will be described below. In the drawings, reference numeral 1 is the electrically retractable peripheral visibility device for a vehicle (hereinafter, simply referred to as "visibility device") according to the present embodiment.
(Description of Electrically Retractable Peripheral Visibility Device for Vehicle 1)

As illustrated in FIG. 1, a visibility device 1 is provided on each of the left and right doors (vehicle body) D of a vehicle (automobile) V. The visibility device 1 is an alternative to a rear view mirror for a vehicle, for example, an outside mirror device (not illustrated) such as a door mirror device mounted on the left and right doors D of the vehicle.

The visibility device 1 mounted on the left-side door D of the vehicle V will be described below. It is noted that the visibility device 1 mounted on the right-side door D of the vehicle V, which is configured in much the same way as the visibility device 1 mounted on the left-side door D of the vehicle V, will not be described.

As illustrated in FIGS. 1 to 5, the visibility device 1 includes a base 2, a shaft 3, a visibility assembly 4, and display devices (monitors) 5M, 5ML, and 5MR. The base 2, the shaft 3, and the visibility assembly 4 are mounted on the door D, and the display devices 5M, 5ML, and 5MR are mounted on the interior (inside the vehicle) of the vehicle V.

That is, the left-side display device 5ML is mounted in the vicinity of the left-side visibility assembly 4. The right-side display device 5ML is mounted in the vicinity of the right-side visibility assembly 4. The center-side display device 5M is mounted in the vicinity of a driver's seat. It is noted that at least one of the left-side display device 5ML, the right-side display device 5ML, and the center-side display device 5M may be mounted.

Figure 3:
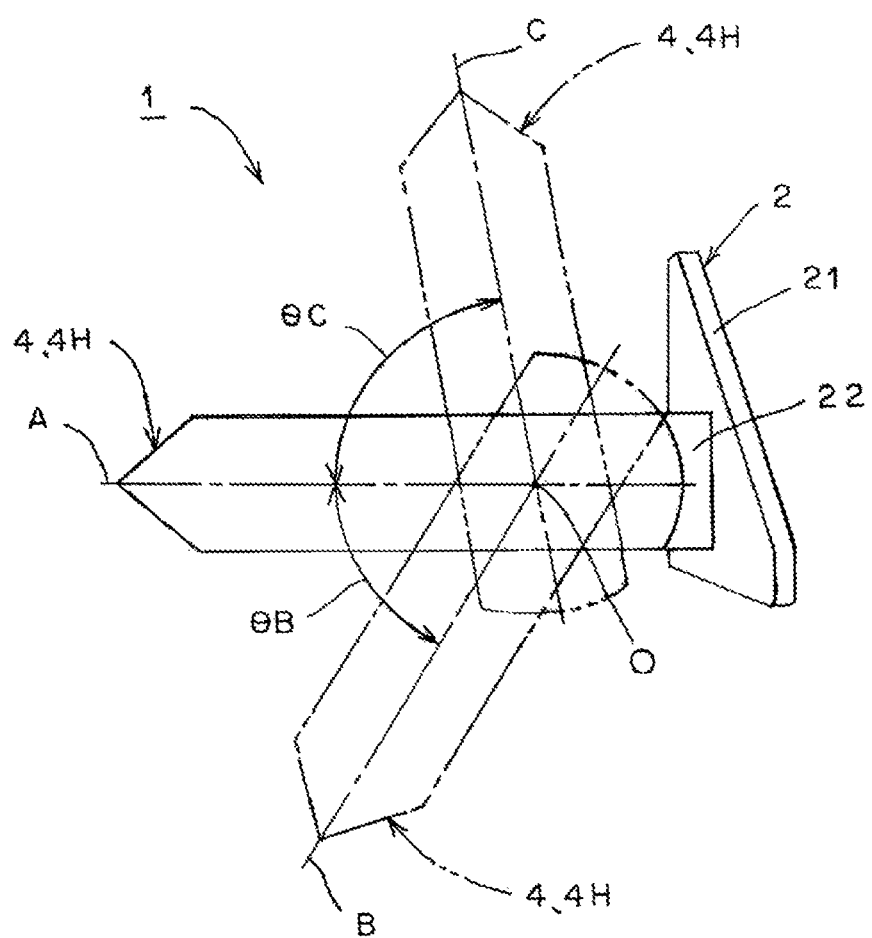
FIG. 3 is a plan view illustrating a use position, a rear retraction position, and a front retraction position of a visibility assembly of a left-side electrically retractable peripheral visibility device for a vehicle mounted on a left-side door of a vehicle.

In FIG. 3, symbol A is a use position (first position) at which the visibility assembly 4 is used. Symbol B is a rear retraction position (second position) of the visibility assembly 4. Symbol C is a front retraction position of the visibility assembly 4. Symbol E is rearward of the vehicle V. Symbol F is frontward of the vehicle V. Symbol O is a rotation center line of the visibility assembly 4, is also a center line of a shaft part 30 of the shaft 3, and is also a rotation center line.

Similarly, in FIG. 3, symbol θB is an angle at which the visibility assembly 4 is rotated from the use position A to the rear retraction position B and retracted in the rear retraction position B, that is, a rear rotation retraction angle. The rear rotation retraction angle θB is also an angle at which the visibility assembly 4 electrically rotates between the use position A and the rear retraction position B, that is, an electric rotation angle. The rear rotation retraction angle GB is about 60° in this example.

Similarly, in FIG. 3, symbol θC is an angle at which the visibility assembly 4 is rotated from the use position A to the front retraction position C and retracted in the front retraction position C, that is, a front rotation retraction angle. The front rotation retraction angle θC is about 80° in this example.

The rear rotation retraction angle θB and the front rotation retraction angle θC are the same angles in the left-side visibility device 1 and the right-side visibility device 1 if a visibility unit 5 described below of the visibility assembly 4 is a camera. On the other hand, if the visibility unit 5 is a mirror, the angle of the left-side visibility device 1 is different from the angle of the right-side visibility device 1.
(Description of Base 2)

Figure 4:
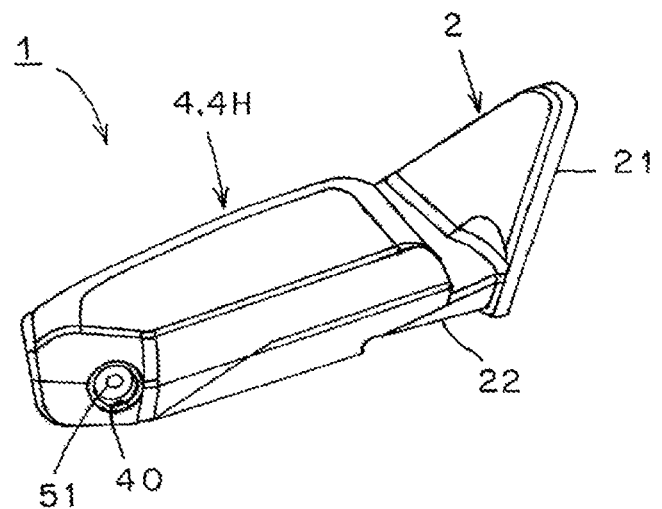

The base 2 is configured by a base member and a cover member configured to cover the base member. As illustrated in FIGS. 1, 3, and 4, the base 2 includes a first fixation part 21 in a vertical plate shape and a second fixation part 22 in a horizontal plate shape. The inside of the base 2 communicates with the inside of the vehicle V through an opening (not illustrated) provided in a vehicle body panel or a door panel of the door D.

The first fixation part 21 is fixed to the door D by a screw or the like (not illustrated). As a result, the base 2 is fixed to the door D, that is, the vehicle body. The second fixation part 22 is fixed with the shaft 3 by a screw or the like. It is noted that the second fixation part 22 is fixed with a fixation part 32 of the shaft 3.
(Description of Shaft 3)

Figure 5:
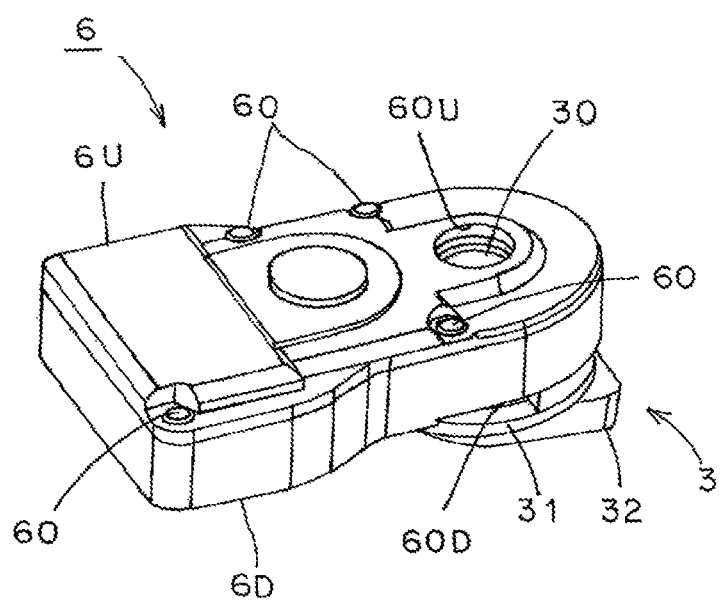
FIG. 5 is a perspective view illustrating an electric retraction unit of the electrically retractable peripheral visibility device for a vehicle.
Figure 6:
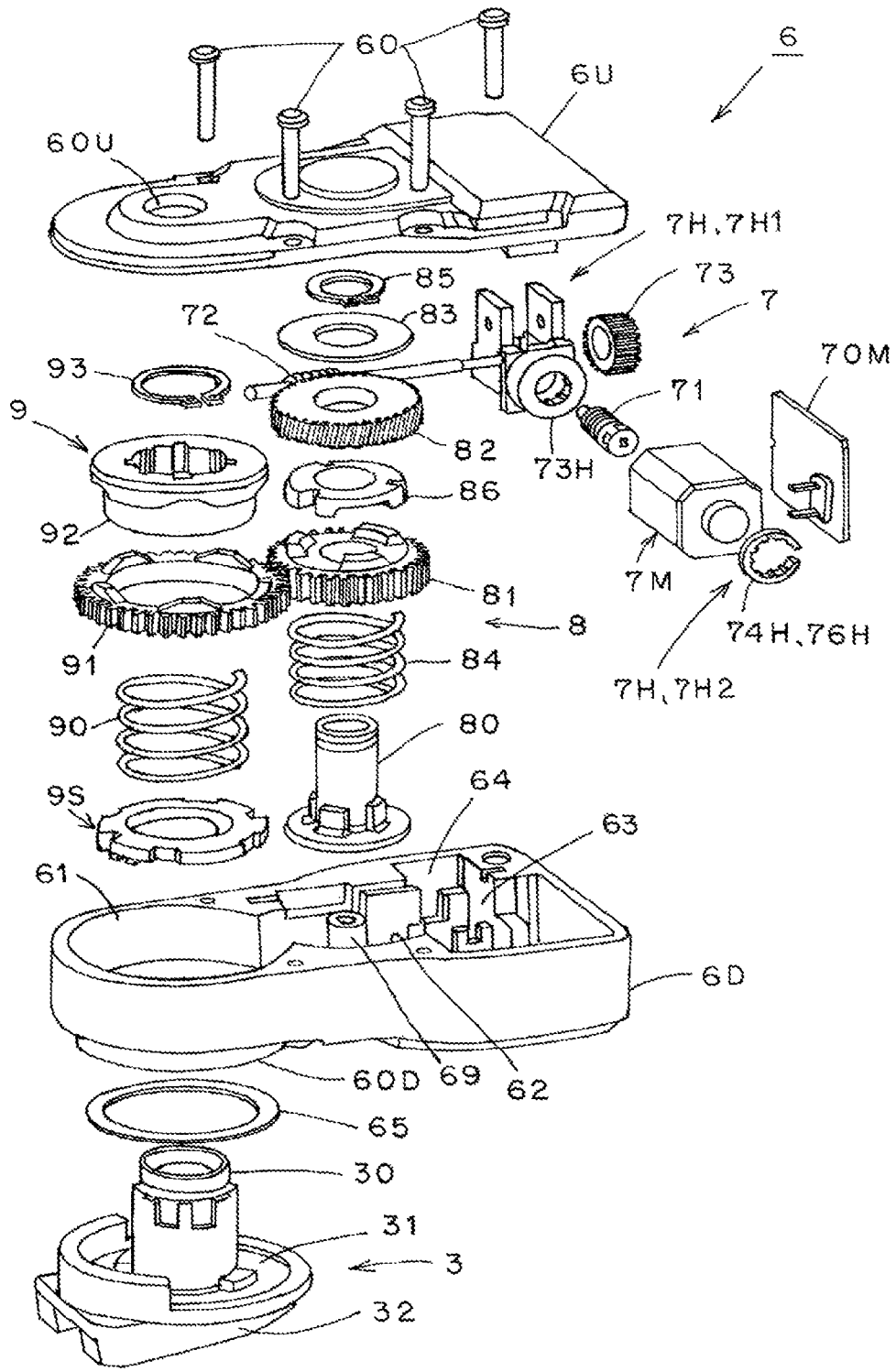
FIG. 6 is an exploded perspective view illustrating a constituent component of the electric retraction unit.

As illustrated in FIGS. 5 and 6, the shaft 3 is configured by a hollow cylindrical shaft part 30, a disk-shaped disk part 31, and a square plate-shaped fixation part 32. That is, a lower end of the shaft part 30 is provided integrally with the disk part 31. A bottom surface of the disk part 31 is provided integrally with the fixation part 32.

A center line (rotation center line) 0 of the shaft part 30 passes through a center of the disk part 31. A part (square plate part) of the fixation part 32 protrudes toward the door D with respect to the shaft part 30 and the disk part 31. The disk part 31 and the fixation part 32 are provided with circular or arbitrary-shaped through holes communicating with a hollow part of the shaft part 30.

An outer peripheral surface from an upper end to an intermediate part of the shaft part 30 is provided with an engagement part. An outer peripheral surface of the upper end of the shaft part 30 is provided with a circular locking groove.

The fixation part 32 is fixed to the second fixation part 22 of the base 2 by a screw or the like. As a result, the shaft 3 is fixed to the base 2.

The top surface of the disk part 31 is provided with an electric operation range regulation convex part serving as an electric operation range regulation part of a stopper mechanism. The electric operation range regulation convex part regulates a range in which the visibility assembly 4 electrically rotates between the use position A and the rear retraction position B (electric operation range). That is, the electric operation range regulation convex part configures the stopper mechanism configured to stop the visibility assembly 4 at each of the use position A and the rear retraction position B.

The top surface of the disk part 31 is provided with a retraction operation range regulation convex part serving as a retraction operation range regulation part. The retraction operation range regulation convex part regulates a retraction operation range of the visibility assembly 4. The retraction operation range regulation convex part forms an arc shape centered on the center line 0 of the shaft part 30.

(Description of Visibility Assembly 4)

The visibility assembly 4 is rotatably attached to the shaft part 30 of the shaft 3, as illustrated in FIGS. 1, 3, and 4. The visibility assembly 4 includes a housing 4H, the visibility unit 5, and an electric retraction unit 6.

(Description of Housing 4H)

As illustrated in FIGS. 3 and 4, the housing 4H has a hollow box shape. In this example, the housing 4H is vertically divided into two parts, and the two parts are water tightly attached to each other by fitting, adhering, welding, or the like. A circular through hole 40 is provided on the rear surface of the end of the housing 4H opposite to the shaft 3.

Parts of the visibility unit 5 and the electric retraction unit 6 are accommodated in the housing 4H. That is, the fixation part 32 of the shaft 3 of the electric retraction unit 6 is located outside the housing 4H and is fixed to the second fixation part 22 of the base 2. Therefore, most of the electric retraction unit 6 except the fixation part 32 of the shaft 3 is accommodated in the housing 4H. It is noted that a camera (not illustrated) separate from the visibility unit 5 may be accommodated in the housing 4H. The camera is a camera configured to visually recognizes a lower part.

(Description of Visibility Unit 5)

Figure 2:
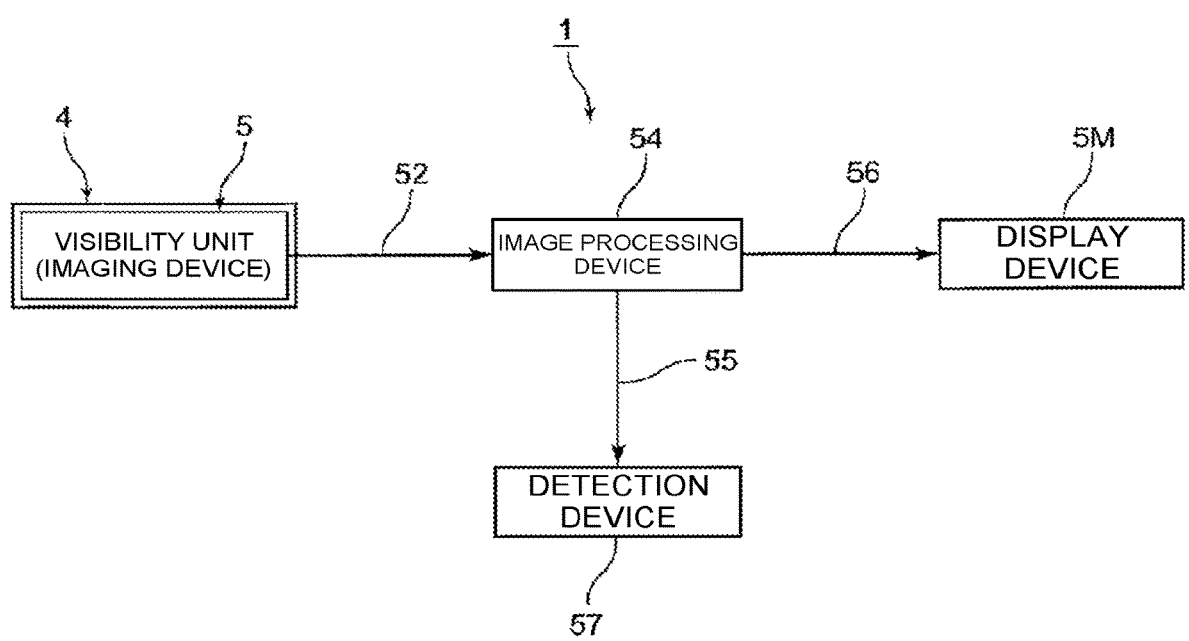
FIG. 2 is a functional block diagram illustrating an overall configuration of the electrically retractable peripheral visibility device for a vehicle.

In this example, the visibility unit 5 is an imaging device (camera) configured to image information around the vehicle V as an image. As illustrated in FIGS. 2 and 4, the visibility unit 5 includes a main body, a lens 51, and a harness 52. The visibility unit 5 is accommodated in the housing 4H and is mounted on the housing 4H.

The main body is fixed to the housing 4H by a screw or the like. The lens 51 faces the through hole 40 of the housing 4H. The harness 52 is connected to the main body. The harness 52 is wired from the inside of the housing 4H through the inside of the shaft 3 and the inside of the base 2 to the inside of the vehicle V. The harness 52 is provided with a connector configured to electrically connect to the electric retraction unit 6.

To ensure that the visibility unit 5 images a visual field equivalent to or wider than a visual field on a lateral side and a rear side of the vehicle V of an existing outside mirror device (not illustrated), it is necessary that the visibility unit 5 is located to protrude outwardly from the door D. Therefore, when the visibility assembly 4 is located at the use position A, the housing 4H in which the visibility unit 5 is accommodated and mounted inside protrudes outwardly from the door D. It is noted that an amount of protrusion of the housing 411 is smaller than an amount of protrusion of the existing outside mirror device and the visibility device for a vehicle of PTL 1.

As illustrated in FIG. 2, the visibility unit 5 is connected to an image processing device (image processing ECU) 54 via the harness 52. The image processing device 54 is connected to a detection device 57 and the display devices 5M, 5ML, and 5MR, respectively, via signal lines 55 and 56.

The visibility unit 5 serving as an imaging device images, as an image, information on the rear and lateral sides of the vehicle V in the vicinity of the vehicle V, and outputs the images of the imaged information on the rear and lateral sides of the vehicle V via the harness 52 to the image processing device 54.

The detection device 57 is mounted on the vehicle V. The detection device 57 is connected to the image processing device 54 via the signal line 55. The detection device 57 detects vehicle information and outputs the detected vehicle information as a detection signal to the image processing device 54 via the signal line 55. Examples of the detection device 57 include a steering angle detection part (steering angle sensor), a gear position detection part (gear position sensor), a direction indicator detection part (direction indicator sensor), a vehicle speed detection part (vehicle speed sensor), a vehicle position detection part (vehicle position sensor), an ultrasonic detection part (ultrasonic sensor), other detectors, and the like used alone or in combination.

The image processing device 54 is mounted on the vehicle V. The image processing device 54 is connected to the visibility unit 5, the detection device 57, and the display devices 5M, 5ML, and 5MR, respectively, via the harness 52, and the signal lines 55 and 56. The image processing device 54 appropriately processes the images for information on the rear and lateral sides of the vehicle V imaged by the visibility unit 5, based on the vehicle information from the detection device 57. It is noted that the image processing device 54 may process the images for the information on the rear and lateral sides of the vehicle V imaged by the visibility unit 5 not by the vehicle information of the detection device 57 but by a manual operation of a driver. The image processing device 54 outputs the processed images to the display devices 5M, 5ML, and 5MR.

The display devices 5M, 5ML, and 5MR are mounted within a driver's field of view in the interior (inside the vehicle) of the vehicle V The display device 5M is connected to the image processing device 54 via the signal line 56. The display devices 5M, 5ML, and 5MR display the images processed by the image processing device 54. The driver is capable of visually recognizing the rear and lateral sides of the vehicle V by visually recognizing the images displayed on the display devices 5M, 5ML, and 5MR. That is, the driver is capable of confirming a rear view of the vehicle V.

(Description of Electric Retraction Unit 6)

As illustrated in FIGS. 5 to 17, the electric retraction unit 6 is partially accommodated in the housing 4H, and electrically rotates the visibility assembly 4 between the use position A and the rear retraction position B. The electric retraction unit 6 includes the above-mentioned shaft 3, casings 6U and 6D, a motor 7M, a deceleration mechanism 7, a holding member (a plate, a holding plate) 7H, a clutch mechanism 8, a rotational force transmission mechanism 9, and a stopper 9S of the stopper mechanism.

The shaft 3, the motor 7M, the deceleration mechanism 7, the holding member 7H, the clutch mechanism 8, the rotational force transmission mechanism 9, and the stopper 9S are accommodated in the casings 6U and 6D. The motor 7M, the deceleration mechanism 7, the holding member 7H, and the clutch mechanism 8 are arranged in a direction intersecting with (orthogonal to or substantially orthogonal to) an axial direction of the shaft 3. An axial direction G of the drive shaft (an output shaft, a rotation shaft) 71M of the motor 7M and an axial direction of the shaft 3 intersect (orthogonally or substantially orthogonally) each other. Here, the axial direction of the shaft 3 is a rotation center line 0 direction.

As illustrated in FIGS. 6 and 17(A), in a plan view viewed from the top to the bottom, the clutch mechanism 8 is arranged between the rotational force transmission mechanism 9 and the motor 7M. An arrangement direction H of the rotational force transmission mechanism 9, the clutch mechanism 8, and the motor 7M and an axial direction G of the drive shaft 71M of the motor 7M intersect (orthogonally or substantially orthogonally) each other. As a result, an amount of protrusion of the casings 6U and 6D, that is, the visibility assembly 4 (dimensions in a left-right direction in FIG. 1) is smaller than an amount of protrusion of the existing outside mirror device and an amount of protrusion of the visibility device for a vehicle of PTL 1. It is noted that the arrangement direction H is a direction connecting the rotation center line 0 and an axis O1 described later.

(Description of Motor 7M)

As illustrated in FIGS. 6 to 11, the motor 7M is held by the holding member 7H. The motor 7M is attached to the casings 6U and 6D via the holding member 7H, and is accommodated in the casings 6U and 6D. The motor 7M is provided with a switch circuit board 70M. The switch circuit board 70M is provided with a terminal. The terminal is arranged in a connector part of the lower casing 6D. When the connector of the harness 52 is detachably fitted to the connector part of the lower casing 6D to be electrically connected to the terminal, the motor 7M is supplied with power via the harness 52, the connector, the terminal, and the switch circuit board 70M.

The above-mentioned motor 7M includes the drive shaft 71M, a main body part 72M, a tubular part 73M, and an end cap part 74M. That is, the tubular part 73M is provided on one surface of the main body part 72M. The drive shaft 71M rotatably protrudes from the tubular part 73M. On the other surface opposite to the one surface of the main body part 72M, the end cap part 74M is provided.

(Description of Deceleration Mechanism 7)

As illustrated in FIGS. 6 to 12, the deceleration mechanism 7 is held by the holding member 7H together with the motor 7M. The deceleration mechanism 7 is attached to the casings 6U and 6D together with the motor 7M via the holding member 7H, and is accommodated in the casings 6U and 6D.

The deceleration mechanism 7 includes a first worm gear 71, a second worm gear 72, and a helical gear 73 as an intermediate gear.

The first worm gear 71 has one end being provided with a first shaft part 711 serving as a shaft part and has the other end being provided with a second shaft part 712. The first shaft part 711 is attached to the drive shaft 71M of the motor 7M. A diameter of the first shaft part 711 is larger than a diameter of the second shaft part 712.

The second worm gear 72 has one end being provided with a first shaft part 721 and has the other end being provided with a second shaft part 722. A diameter of one end portion (distal end portion) of the first shaft part 721 is smaller than a diameter of the other end portion (portion on the second worm gear 72 side) of the first shaft part 721.

The helical gear 73 is fixed to a large diameter portion of the first shaft part 721. As a result, the helical gear 73 rotates simultaneously with the second worm gear 72 on the same axis. The helical gear 73 meshes with the first worm gear 71.

(Description of Clutch Mechanism 8)

As illustrated in FIG. 6, the clutch mechanism 8 is attached to the casings 6U and 6D, and is accommodated in the casings 6U and 6D. The clutch mechanism 8 includes a clutch shaft 80, a first clutch gear 81, a second clutch gear 82, a clutch 86, a washer 83, a coiled clutch spring 84, and a C ring 85.

It is noted that the second clutch gear 82 and the clutch 86 in this example are configured separately. The second clutch gear 82 and the clutch 86 are fitted to each other to disable rotation relative to each other. However, the second clutch gear 82 and the clutch 86 may be integrally formed.

A lower end of the clutch shaft 80 is attached to the lower casing 6D. A center line (hereinafter referred to as "axis") O1 of the clutch shaft 80 is parallel to or substantially parallel to the shaft 3, that is, the rotation center line 0.

The clutch shaft 80 is fitted with a clutch spring 84, the first clutch gear 81, the clutch 86, the second clutch gear 82, the washer 83, and the C ring 85 from outside in this order from the bottom to the top. As a result, the clutch mechanism 8 is configured as one unit in a space from a flange part at the lower end of the clutch shaft 80 to the C ring 85 at the upper end of the clutch shaft 80. The second clutch gear 82 is meshed with the second worm gear 72.

A top surface of the first clutch gear 81 is formed with a plurality, in this example, three, of notched convex parts at equal intervals or substantially equal intervals in a circumferential direction around the axis O1. A bottom surface of the clutch 86 is formed with a plurality, in this example, three, of notched concave parts at equal intervals or substantially equal intervals in the circumferential direction around the axis O1 to correspond to the three notched convex parts of the first clutch gear 81. It is noted that the first clutch gear 81 may be provided with the notched concave parts and the clutch 86 may be provided with the notched convex parts. If the second clutch gear 82 serving as the second clutch and the clutch 86 are formed integrally, the second clutch gear 82 may be provided with the notched concave parts or the notched convex parts.

In normal times, the notched convex part of the first clutch gear 81 and the notched concave part of the clutch 86 are fitted, in an engaged state, by a spring force of the clutch spring 84, not disengaged with a rotational force of the motor 7M, to transmit the rotational force of the motor 7M via the deceleration mechanism 7 to the rotational force transmission mechanism 9. When a force from outside larger than the rotational force of the motor 7M is applied to the casings 6U and 6D, that is, the visibility assembly 4, the notched convex part of the first clutch gear 81 and the notched concave part of the clutch 86 are released from the engaged state against the spring force of the clutch spring 84 into a disengaged state not to transmit the above-mentioned force (that is, an external force larger than the rotational force of the motor 7M) to the deceleration mechanism 7, and rotate the casings 6U and 6D, that is, the visibility assembly 4.

It is noted that all of the clutch mechanism 8 in this example are accommodated in the casings 6U and 6D. However, a part of the clutch mechanism 8, for example, a part of the clutch shaft 80 and the clutch spring 84 may be arranged outside the casings 6U and 6D.

(Description of Rotational Force Transmission Mechanism 9)

As illustrated in FIG. 6, the rotational force transmission mechanism 9 is attached to the shaft 3 and is accommodated in the casings 6U and 6D. The rotational force transmission mechanism 9 transmits the rotational force of the motor 7M to the casings 6U and 6D via the deceleration mechanism 7 and the clutch mechanism 8 to rotate the casings 6U and 6D, that is, the visibility assembly 4, between the use position A being the first position and the rear retraction position B being the second position.

The rotational force transmission mechanism 9 includes a lift gear 91, a lift holder 92, and a C ring 93. The lift gear 91, the lift holder 92, and the C ring 93 are sequentially fitted to the shaft part 30 of the shaft 3 from the lower side. The lift gear 91 is meshed with the second clutch gear 82 of the clutch mechanism 8.

(Description of Stopper 9S)

As illustrated in FIG. 6, the stopper 9S is fitted to the shaft part 30 of the shaft 3, is interposed between the coiled spring 90 and the lower casing 6D, and is accommodated in the casings 6U and 6D. The stopper 9S stops the casings 61J and 6D, that is, the visibility assembly 4, at each of the use position A being the first position and the rear retraction position B being the second position.

(Description of Holding Member 7H)

As illustrated in FIGS. 6 to 14, the holding member 7H holds the motor 7M and the deceleration mechanism 7, and is held in the casings 6U and 6D. As a result, the holding member 7H is attached to the casings 6U and 6D together with the motor 7M and the deceleration mechanism 7, and is accommodated in the casings 6U and 6D. The holding member 7H is configured of an elastic member, for example, a member such as POM. The holding member 7H is lower (smaller) in stiffness than the casings 6U and 6D. The holding member 7H is capable of highly accurately attaching the motor 7M and the deceleration mechanism 7 to the casings 6U and 6D.

The holding member 7H includes a gear first holding part 71H, a gear second holding part 72H, a motor first fitting and holding part 73H, a motor second fitting and holding part 74H, a first fitted and held part 75H, a second fitted and held part 76H, a pair of gear fitting and holding parts 77H, which serve as a gear holding part, a first rib 78H serving as a plurality of motor ribs, and a second rib 79H serving as at least one (in this example, one) casing rib. The first rib 78H and the second rib 79H form a bead shape.

The holding member 7H in this example is manufactured separately by molding, into two members (two components), for example, a first holding member 7H1 and a second holding member 7H2.

(Description of First Holding Member 7H1)

The first holding member 7H1 includes the gear first holding part 71H, the gear second holding part 72H, the motor first fitting and holding part 73H, the first fitted and held part 75H, the pair of gear fitting and holding parts 77H, a plurality of the first ribs 78H, and a plurality of the second ribs 79H.

The first holding member 7H1 is configured of one component. That is, the first holding member 7H1 has a hollow tubular shape, as a basic shape, in which the first worm gear 71, the drive shaft 71M of the motor 7M, and the tubular part 73M thereof are housed. The first holding member 7H1 has a shape obtained by integrally providing a pair of flat plate shapes having a space housing therein the helical gear 73 in a tubular shape.

(Description of Each Part of First Holding Member 7H1)

As illustrated in FIGS. 7 to 10 and 14, the gear first holding part 71l1 is provided in an intermediate portion of the first holding member 7111. The gear first holding part 71H is provided with a circular through hole. In the circular through hole of the gear first holding part 71H, the first shaft part 711 of the first worm gear 71 is held rotatably. An inner surface of the gear first holding part 7111 and an outer surface of the first shaft part 711 have a minimum required clearance.

Figure 7:
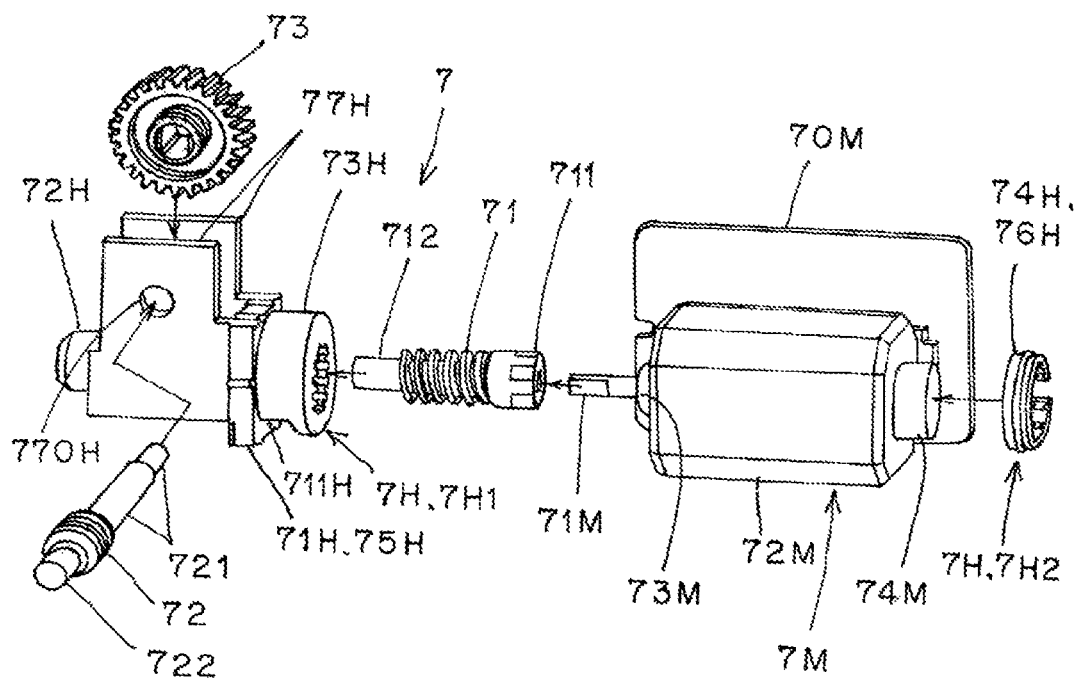
FIG. 7 is an exploded perspective view illustrating a motor, a deceleration mechanism, and a holding member of the electric retraction unit.
Figure 10:
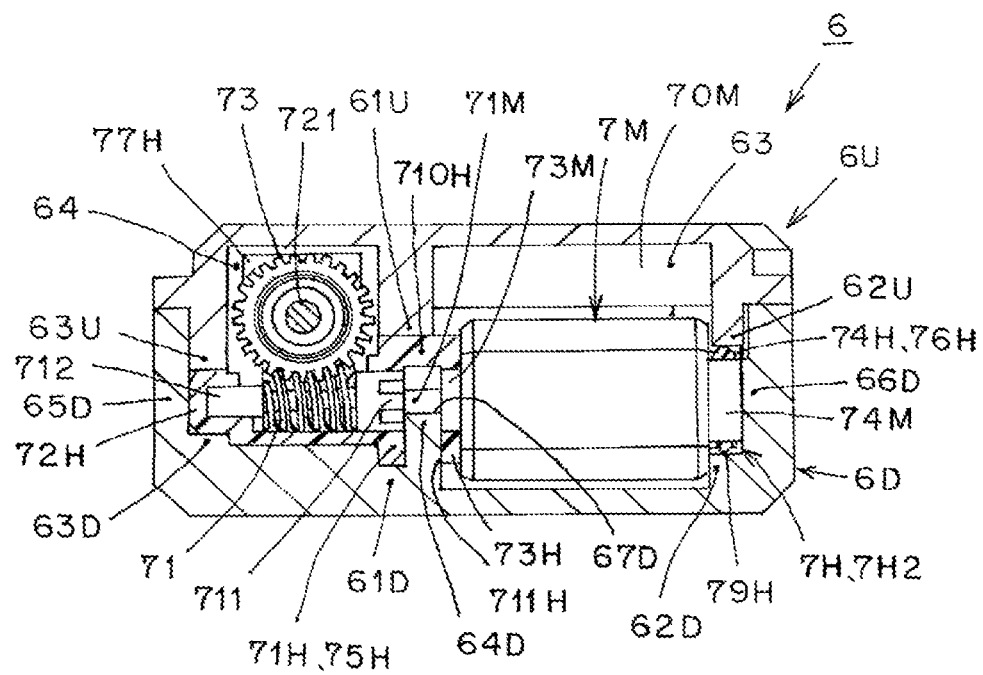
FIG. 10 is a cross-sectional view (a view on arrow X in FIG. 9) illustrating an assembled state of the electric retraction unit.
Figure 11:
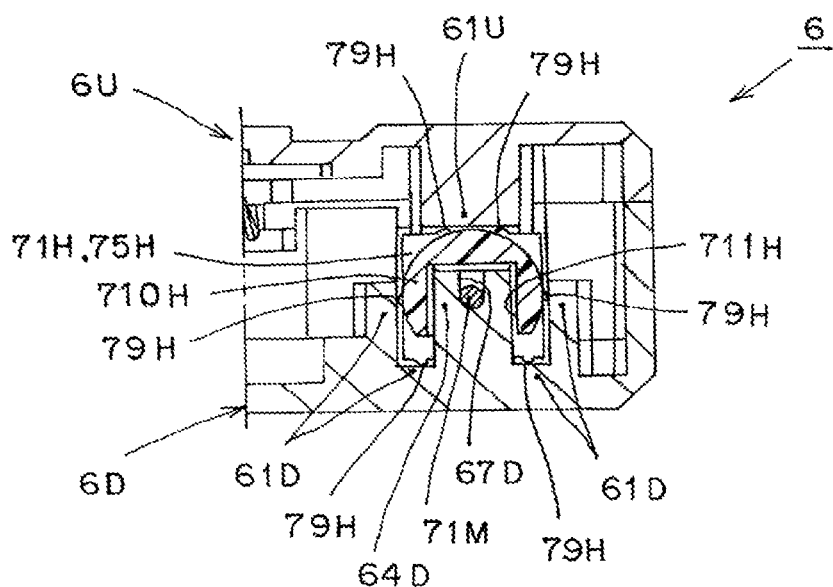
FIG. 11 is a cross-sectional view (cross-sectional view taken along XI-XI line in FIG. 9) also illustrating the assembled state of the electric retraction unit.
Figure 14:
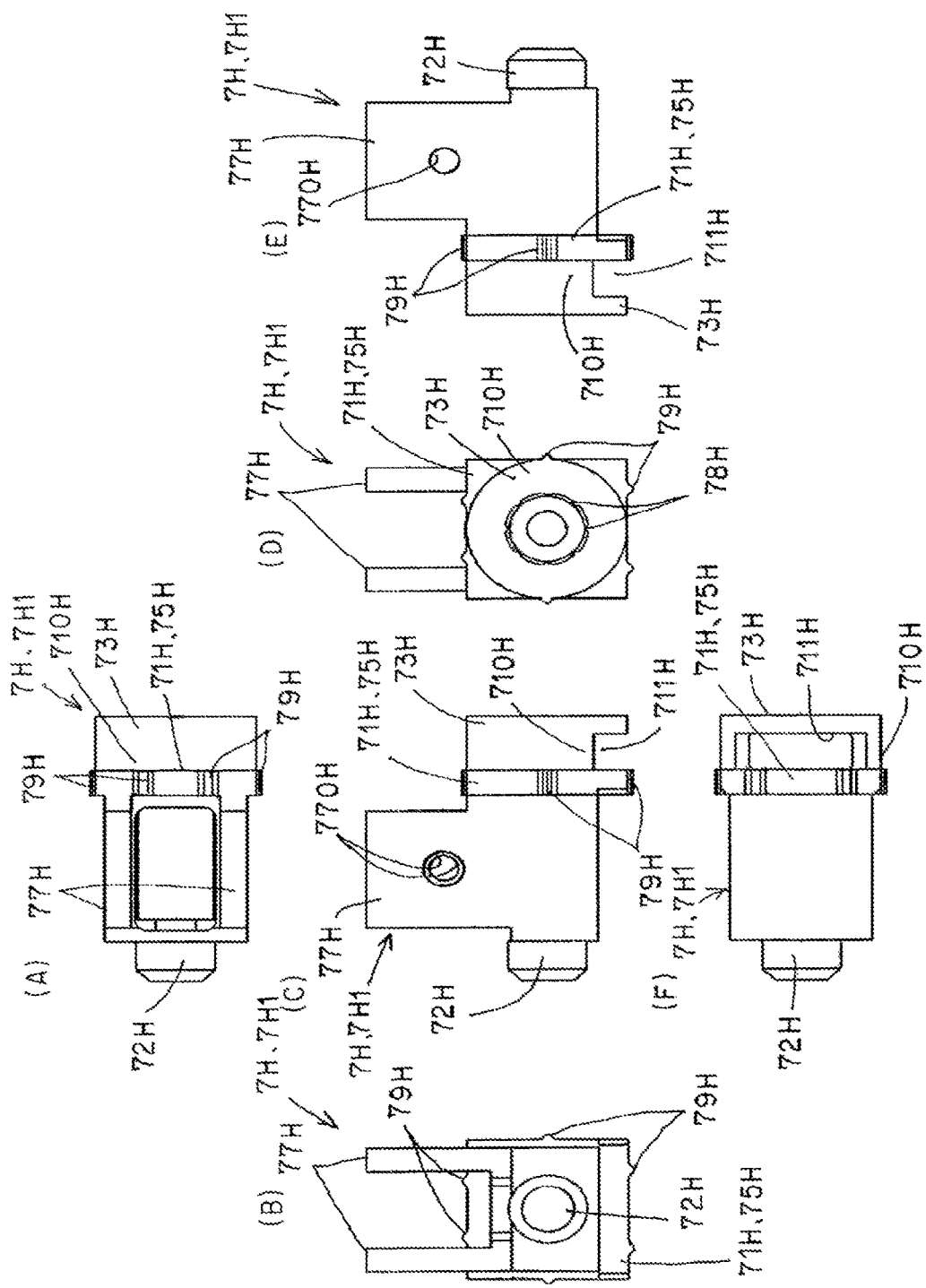
FIG. 14 is an explanatory view illustrating the holding member excluding a motor second fitting and holding part.

As illustrated in FIGS. 7, 10, and 14, the gear second holding part 7211 is provided at one end of the first holding member 7111. The gear second holding part 72H has a cylindrical shape with one end closed. In a circular concave part of the gear second holding part 72H, the second shaft part 712 of the first worm gear 71 is held rotatably. An inner surface of the gear second holding part 72H and an outer surface of the second shaft part 712 have a minimum required clearance.

As illustrated in FIGS. 6, 7, 10, 13, and 14, the motor first fitting and holding part 73H is provided at the other end of the first holding member 7H1. The motor first fitting and holding part 7311 is a portion adjacent to the gear first holding part 71H and is provided at a portion opposite to the gear second holding part 72H. The motor first fitting and holding part 73H has a cylindrical shape with a hollow therein. In a circular hollow portion of the motor first fitting and holding part 73H, the tubular part 73M of the motor 7M is fitted and held. That is, the motor first fitting and holding part 73H fits and holds the tubular part 73M from the outside.

An inner surface of the motor first fitting and holding part 73H is provided integrally with the plurality of first ribs 78H in the axial direction G. An apex surface of the first rib 78H and an outer surface of the tubular part 73M have an overlapped dimension. As a result, when the apex surface of the first rib 78H and the outer surface of the tubular part 73M are brought into contact with each other in an overlapped state, the motor first fitting and holding part 73H is capable of holding the tubular part 73M via the plurality of first ribs 78H without a backlash.

A portion 710H between the gear first holding part 71H and the motor first fitting and holding part 73H is a portion 710H adjacent to the gear first holding part 71H. In the portion 710H adjacent to the gear first holding part 71H, an insertion hole 711H is provided between a lower side and somewhere on the upper side. The insertion hole 711H communicates with the through hole of the gear first holding part 71H and the hollow portion of the motor first fitting and holding part 73H. The insertion hole 711H is of rectangular parallelepiped shape. An outer shape of the portion 710H adjacent to the gear first holding part 71H has a tubular shape having the same diameter as the motor first fitting and holding part 73H.

As illustrated in FIGS. 7 to 11, 13, and 14, the first fitted and held part 75H is provided in an intermediate portion of the first holding member 7H1. The first fitted and held part 75H is integrally structured with the gear first holding part 71H. The first fitted and held part 75H has a square plate shape having one side equivalent to a diameter of the motor first fitting and holding part 73H. The first fitted and held part 75H is fitted and held from the outside by a first fitting and holding parts 61U and 61D of the casings 6U and 6D.

An outer surface of the first fitted and held part 75H is provided integrally with a plurality of the second ribs 79H in the axial direction G. An apex surface of the second rib 79H and inner surfaces of the first fitting and holding parts 61U and 61D have an overlapped dimension. As a result, when the apex surface of the second rib 79H and the inner surfaces of the first fitting and holding parts 61U and 61D are brought into contact with each other in an overlapped state, the first fitted and held part 75H is held by the first fitting and holding parts 61U and 61D via the plurality of second ribs 7911 without a backlash.

Here, the gear first holding part 71H holding the first shaft part 711 of the first worm gear 71 is fitted and held in the casings 6U and 6D via the second rib 79H. On the other hand, the gear second holding part 72H holding the second shaft part 712 of the first worm gear 71 is directly fitted and held in the casings 6U and 6D without passing through the second rib 79H. As a result, a fitting and holding state to the casings 6U and 6D by the gear second holding part 72H has a degree of freedom as compared with the fitting and holding state to the casings 6U and 6D by the gear first holding part 71H.

As illustrated in FIGS. 7 to 11, 13, and 14, the pair of gear fitting and holding parts 77H are provided at the intermediate portions of the first holding member 7H1 of the holding member 7H and between the gear first holding part 71H and the first fitted and held part 75H and the gear second holding part 72H. Between the pair of gear fitting and holding parts 77H, a housing space part is provided. In the housing space part, the first worm gear 71 and the helical gear 73 of the deceleration mechanism 7 are housed. Lower portions of the pair of gear fitting and holding parts 77H are integrally connected.

The pair of gear fitting and holding parts 77H are each provided with circular through holes 770H. An inner diameter of one of the through holes 770H is smaller than an inner diameter of the other of the through holes 770H. In the through hole 770H with a smaller diameter and the through-hole 770H with a larger diameter, a small-diameter portion and a large-diameter portion of the first shaft part 721 of the second worm gear 72 are rotatably fitted and held, respectively. As a result, the second worm gear 72 held in the casings 6U and 6D is fitted in the circular through hole 770H of the pair of gear fitting and holding parts 77H in which positional displacement is unlikely to occur.

An inner surface of the through hole 770H with a smaller diameter and an outer surface of the small-diameter portion of the first shaft part 721 have a minimum required clearance. An inner surface of the through hole 770H with a larger diameter and an outer surface of the large-diameter portion of the first shaft part 721 have a minimum required clearance.

As described above, the first holding member 7H1 of the holding member 7H houses the first worm gear 71, the drive shaft 71M of the motor 7M, and the tubular part 73M thereof, into the gear first holding part 71H, the gear second holding part 72H, the motor first fitting and holding part 73H, and the first fitted and held part 75H forming a tubular shape. The first holding member 7H1 of the holding member 7H houses the helical gear 73 between the pair of gear fitting and holding parts 77H forming a pair of flat plate shapes.
(Description of Second Holding Member 7H2)

The second holding member 7H2 includes the motor second fitting and holding part 74H, the second fitted and held part 76H, the plurality of first ribs 78H, and one second rib 79H. One component serves as the motor second fitting and holding part 74H and the second fitted and held part 76H.

As illustrated in FIGS. 6 to 10 and 13, the motor second fitting and holding part 74H and the second fitted and held part 76H form a C shape obtained by cutting a part having an annular shape. In a circular hollow part of the motor second fitting and holding part 74H (including the second fitted and held part 76H), the end cap part 74M of the motor 7M is fitted and held. That is, the motor second fitting and holding part 74H fits and holds the end cap part 74M from the outside.

An inner surface of the motor second fitting and holding part 74H is provided integrally with the plurality of first ribs 78H in the axial direction G. An apex surface of the first rib 78H and an outer surface of the end cap part 74M include an overlapped dimension. As a result, the apex surface of the first rib 78H1 and the outer surface of the end cap part 74M are brought into contact with each other in an overlapped state, and thus, the motor second fitting and holding part 74H is capable of holding the end cap part 74M via the plurality of first ribs 78H without a backlash.

The second fitted and held part 76H (including the motor second fitting and holding part 74H) is fitted and held by second fitting and holding parts 62U and 62D of the casings 6U and 6D from the outside. An outer surface of the second fitted and held part 76H in an annular shape is provided integrally with the plurality of second ribs 79H in the circumferential direction. An apex surface of the second rib 79H and inner surfaces of the second fitting and holding parts 62U and 62D have an overlapped dimension. As a result, when the apex surface of the second rib 79H1 and the inner surfaces of the second fitting and holding parts 62U and 62D are brought into contact with each other in an overlapped state, the second fitted and held part 76H is held by the second fitting and holding parts 62U and 62D via the plurality of second ribs 79H without a backlash.
(Description of Casings 6U and 6D)

As illustrated in FIGS. 5, 6, 9 to 12, 15, and 16, the casings CU and 6D are rotatably attached to the shaft 3 and fixed to the housing 4H by a screw or the like.

The casings CU and GD include the upper casing (cover) CU and the lower casing (gear case) 6D. The upper casing 6U and the lower casing 6D are fixed to each other by a plurality of (in this example, four) screws 60. The casings 6U and 6D are configured of a member higher in stiffness than the holding member 7H, for example, a synthetic resin material (PA material) containing a glass fiber. As a result, the casings 6U and 6D have better dimensional stability than a member lower in stiffness than the casings 6U and 6D. That is, the casings 6U and 6D have smaller manufacturing dimensional tolerances than the members lower in stiffness than the casings 6U and 6D.
(Description of Upper Casing 6U)

As illustrated in FIGS. 5, 6, and 9 to 12, the upper casing 6U has a cover shape closing an opening at the upper surface of the lower casing 6D. One end of the upper casing 6U is provided with a circular through hole 60U. A circular peripheral edge of the through hole 60U forms a cylindrical part recessed from the upper casing CU. An upper end of the shaft part 30 of the shaft 3 is fitted from the outside into the cylindrical part of the upper casing GU. As a result, the upper casing 6U is rotatably attached to the shaft part 30 of the shaft 3. A center line of the cylindrical part of the upper casing 6U (center of the through hole 60U) coincides with the center line 0 of the shaft part 30 of the shaft 3, that is, the rotation center line 0.
(Description of Lower Casing 6D)

As illustrated in FIGS. 5, 6, 9 to 12, 15, and 16, the lower casing 6D is a gear case, and has a case shape with an upper surface opened and a lower surface closed. A bottom surface (lower surface) at one end of the lower casing 6D is provided integrally with a mounting part 60D. In the mounting part 60D, a planar shape (shape seen from above) or a bottom surface shape (shape seen from below) forms a disk shape. A circular through hole is provided at the center of the mounting part 60D. A center of the mounting part 60D and a center of the through hole are concentric and coincide with the rotation center line 0.

The shaft part 30 of the shaft 3 is inserted into the through hole of the lower casing 6D. The bottom surface of the mounting part 60D of the lower casing 6D is mounted on an upper surface of the disk part 31 of the shaft 3 with a washer 65 interposed therebetween. As a result, the casings GU and GD are rotatably attached to the shaft 3. An intermediate portion of the lower casing 6D is provided integrally with a shaft part 69 into which the clutch shaft 80 is fitted from the outside.

(Description of Accommodation Concave Parts 61, 62, 63, and 64)

As illustrated from FIGS. 9 to 12, the shaft 3, the rotational force transmission mechanism 9, the stopper 9S, the clutch mechanism 8, the motor 7M, the deceleration mechanism 7, and the holding member 7H are accommodated in the casings 6U and 6D. That is, the casings 6U and 6D include a first accommodation concave part 61, a second accommodation concave part 62, a third accommodation concave part 63, and fourth accommodation concave parts 64. That is, on a surface on which the upper casing GU and the lower casing 6D face to each other, the first accommodation concave part 61, the second accommodation concave part 62, the third accommodation concave part 63, and the fourth accommodation concave parts 64 are provided.

The first accommodation concave part 61 is provided at one end of the casings 6U and 6D. In the first accommodation concave part 61, the shaft 3, the rotational force transmission mechanism 9, the spring 90, the stopper 9S, and the washer 65 are accommodated.

The second accommodation concave part 62 is provided adjacent to the first accommodation concave part 61 at an intermediate portion of the casings 6U and 6D. In the second accommodation concave part 62, the clutch mechanism 8 is accommodated.

The third accommodation concave part 63 is provided adjacent to the second accommodation concave part 62 at the other end of the casings 6U and 6D. In the third accommodation concave part 63, the motor 7M, the holding member 7H, and the switch circuit board 70M are accommodated.

The fourth accommodation concave parts 64 are provided adjacent to the second accommodation concave part 62 at an intermediate portion of the casings 6U and 6D, and are provided adjacent to the third accommodation concave part 63 at the other end of the casings 6U and GD. In two fourth accommodation concave parts 64, the deceleration mechanism 7 and the holding member 711 are accommodated.

(Description of Bearing Part 66)

Figure 12:
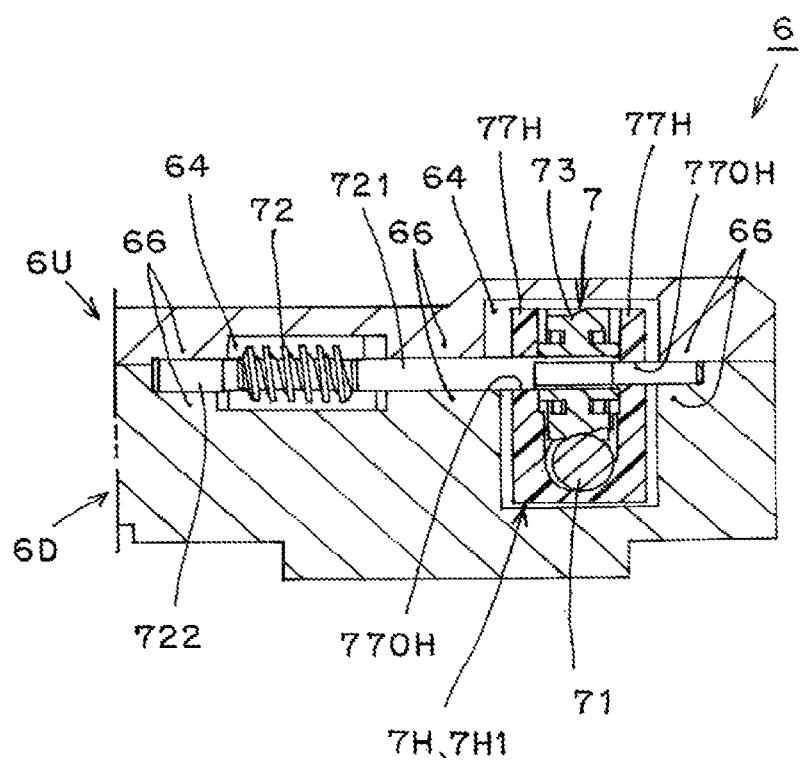
FIG. 12 is a cross-sectional view (cross-sectional view taken along XII-XII line in FIG. 9) also illustrating the assembled state of the electric retraction unit.
Figure 13:
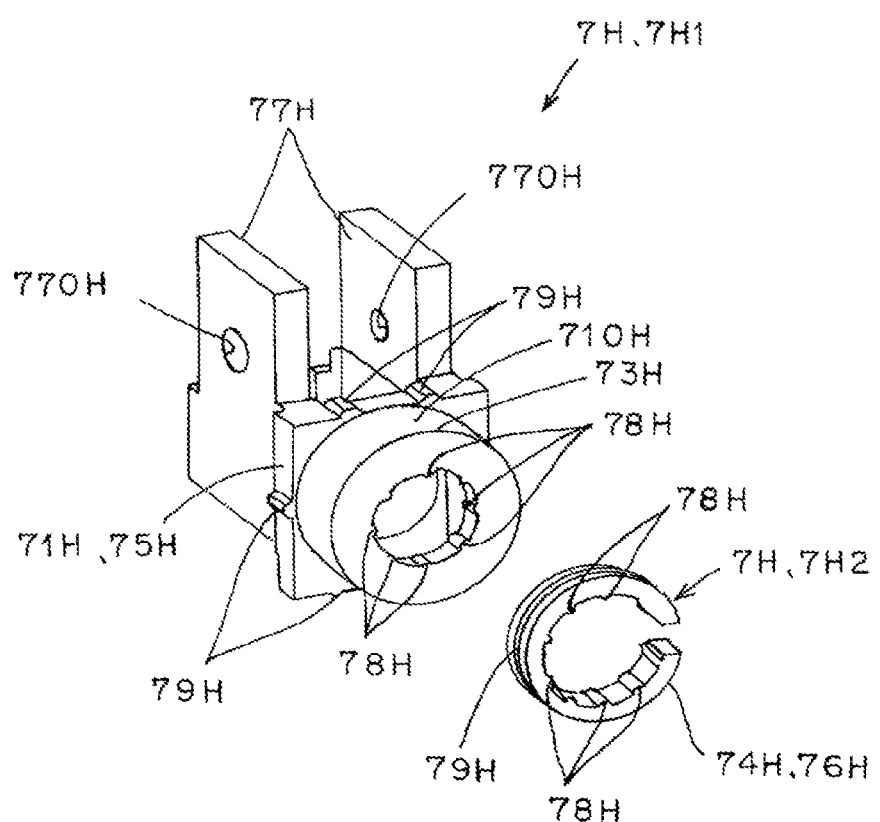
FIG. 13 is a perspective view illustrating the holding member of the electric retraction unit.
Figure 15:
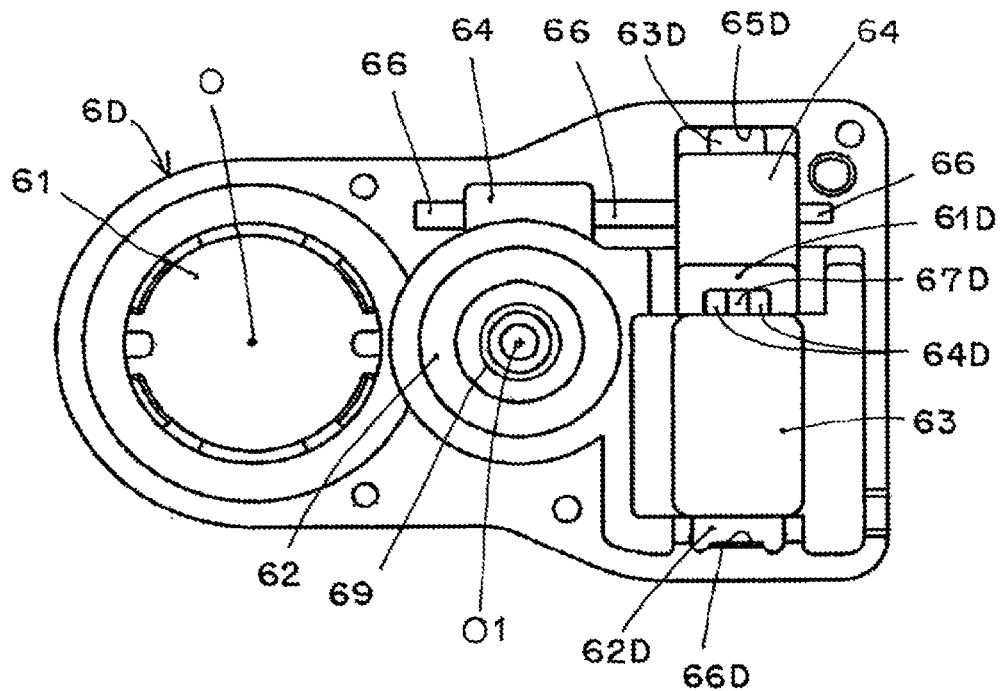
FIG. 15 is a plan view illustrating a lower casing (gear case).
Figure 16:
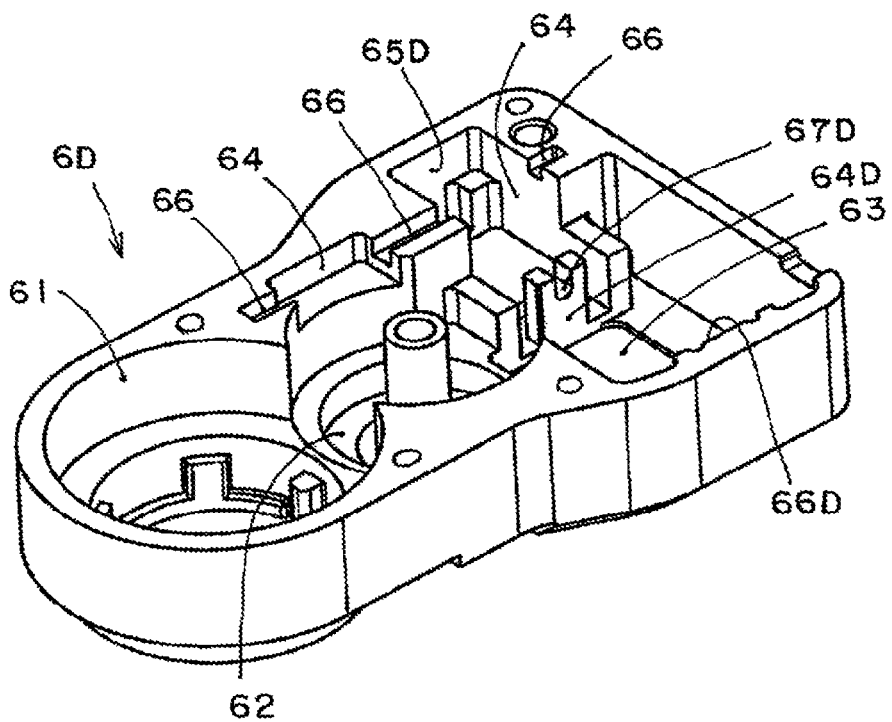
FIG. 16 is a perspective view illustrating the lower casing (gear case).
Figure 17:
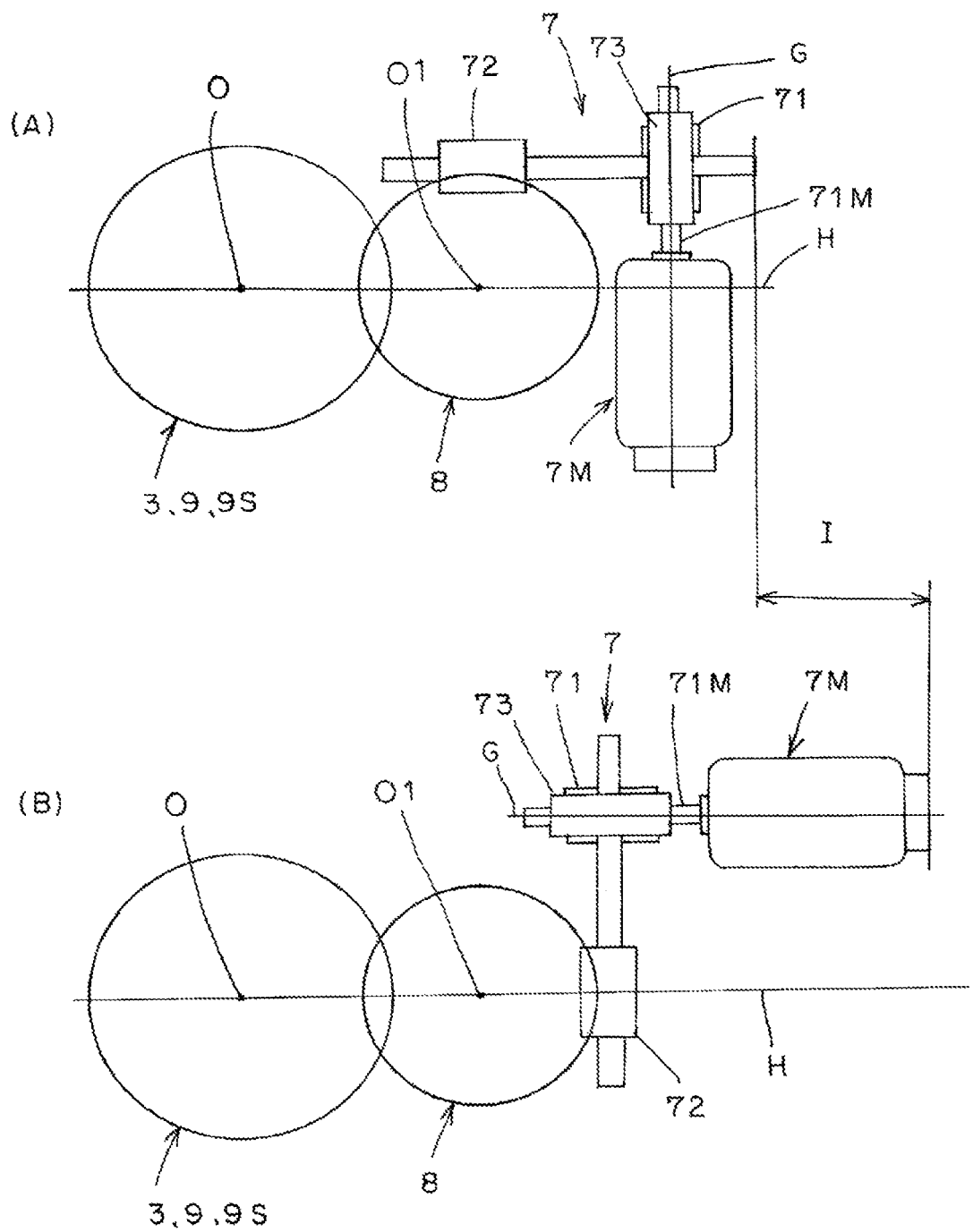
FIG. 17 is a schematic plan view illustrating an arrangement state of a rotational force transmission mechanism, a clutch mechanism, the motor, and the deceleration mechanism.

As illustrated in FIGS. 12 and 15, the second worm gear 72 is rotatably borne on the casings 6U and 6D. That is, on a surface facing the upper casing 6U and the lower casing 6D, the bearing parts 66 are provided.

The bearing parts 66 are each provided at one end side, an intermediate portion, and the other end side of the two fourth accommodation concave parts 64 from the intermediate portion to the one end of the casings 6U and 6D. In three bearing parts 66, the small diameter portion and the large diameter portion of the first shaft part 721 of the second worm gear 72 and the second shaft part 722 of the second worm gear 72 are each rotatably borne. The bearing part 66 receives a radial load and a thrust load of the second worm gear 72.

(Description of Fitting and Holding Parts 61U, 61D, 62U, 62D, 63U, and 63D)

As illustrated in FIGS. 9 to 11 and 15, the casings 6U and 6D include a fitting and holding part configured to fit and hold the holding member 7H, that is, the first fitting and holding parts 61U and 61D, the second fitting and holding parts 62U and 62D, and third fitting and holding parts 63U and 63D. The fitting and holding parts 61U, 61D, 62U, 62D, 63U, and 63D receive a radial load of the first worm gear 71 and a radial load of the motor 7M.

The first fitting and holding parts 61U and 61D are provided between the third accommodation concave part 63 and the fourth accommodation concave parts 64 of the casings 6U and GD. That is, the first fitting and holding parts 61U and 61D are provided on a surface where the upper casing 6U and the lower casing 6D face to each other, the surface facing an outer surface of the first fitted and held part 7511 (integrally structured with the gear first holding part 71H) of the first holding member 7H1. The first fitting and holding parts 61U and 61D fit and hold the first fitted and held part 75H by being sandwiched from above and below while crushing the second rib 7911 on the outer surface of the first fitted and held part 75H.

The second fitting and holding parts 62U and 62D are provided at an end of the third accommodation concave part 63 of the casings 6U and 6D (end opposite to the fourth accommodation concave parts 64). That is, the second fitting and holding parts 62U and 62D are provided on a surface where the lower casing 6D and the upper casing 6U face to each other, the surface facing an outer surface of the second fitted and held part 76H (integrally structured with the motor second fitting and holding part 74H) of the second holding member 7H2. The second fitting and holding parts 62U and 62D fit and hold the second fitted and held part 76H by being sandwiched from above and below while crushing the second rib 79H on the outer surface of the second fitted and held part 76H.

The third fitting and holding parts 63U and 63D are provided at an end of the fourth accommodation concave parts 64 of the casings 6U and 6D (end opposite to the third accommodation concave part 63). That is, the third fitting and holding parts 63U and 63D are provided on a surface where the upper casing 6U and the lower casing 6D face to each other, the surface facing an outer surface of the gear second holding part 72H of the first holding member 7H1. The third fitting and holding parts 63U and 63D fit and hold the outer surface of the gear second holding part 72H by being sandwiched from above and below.

(Description of Receiving Parts 64D, 65D, 66D, and 67D)

As illustrated in FIGS. 9 to 11, 15, and 16, the lower casing 6D out of the casings 6U and 6D includes a first receiving part 64D, a second receiving part 65D, a third receiving part 66D, and a fourth receiving part 67D, serving as a receiving part.

The first receiving part 64D is provided to protrude toward an opening at the upper surface of the lower casing 6D, at a place on a third accommodation concave part 63 side out of the first fitting and holding part 61D of the lower casing 6D. The first receiving part 64D is provided to face the insertion hole 711H of the holding member 7H. The first receiving part 64D has a rectangular parallelepiped flat plate shape. When being inserted into the insertion hole 711H of the holding member 7H, the first receiving part 64D receives a thrust load of the first shaft part 711 of the first worm gear 71 on a motor 7M side.

The second receiving part 65D is provided on an upright wall against the third fitting and holding part 63D being a bottom wall, out of the fourth accommodation concave parts 64 of the lower casing 6D. The second receiving part 65D is provided to face an end surface of the gear second holding part 72H of the holding member 7H. When abutting against the end surface of the gear second holding part 72H of the holding member 7H, the second receiving part 65D receives a thrust load of the second shaft part 712 of the first worm gear 71 on a side in a direction opposite to the motor 7M, via the gear second holding part 7211 of the holding member 7H.

The third receiving part 66D is provided on an upright wall against the second fitting and holding part 62D being a bottom wall, out of the third accommodation concave part 63 of the lower casing 6D. The third receiving part 66D is provided to face an end surface of the end cap part 74M of the motor 7M. When abutting against the end surface of the end cap part 74M of the motor 7M, the third receiving part 66D is positioned in the shaft direction on an end cap part 74M side of the motor 7M.

The fourth receiving part 67D is provided at a center of an upper end of the first receiving part 64D of the lower casing 6D. The fourth receiving part 67D is provided to face the drive shaft 71M of the motor 7M. The fourth receiving part 67D has a U shape having a semicircular bottom. The fourth receiving part 67D maintains a clearance from the drive shaft 71M of the motor 7M.

(Description of Assembly of Holding Member 7H, Motor 7M, and Deceleration Mechanism 7)

Assembly of the holding member 7H, the motor 7M, and the deceleration mechanism 7 will be described below with reference to FIGS. 7 and 8.

Firstly, the first shaft part 711 of the first worm gear 71 and the drive shaft 71M of the motor 7M are integrally coupled. The end cap part 74M of the motor 7M is fitted and held by the motor second fitting and holding part 7411 (integrally structured with the second fitted and held part 76H) of the second holding member 7H2.

Between the pair of gear fitting and holding parts 77H of the first holding member 7111, the helical gear 73 is housed. In the through hole 770H of the pair of gear fitting and holding parts 77H of the first holding member 7H1, the first shaft part 721 of the second worm gear 72 is rotatably fitted and held. At the same time, the first shaft part 721 of the second worm gear 72 is inserted through the through hole of the helical gear 73 to integrally fix the helical gear 73 and the second worm gear 72.

The first holding member 7H1 out of the holding member 7H is assembled with the deceleration mechanism 7, the motor 7M, and the second holding member 7112 out of the holding member 7H (see a solid arrow in FIG. 7). That is, the second shaft part 712 of the first worm gear 71 is rotatably held by the gear second holding part 72H of the first holding member 7H1. In the first holding member 7H1, the first worm gear 71 is housed. The first shaft part 711 of the first worm gear 71 is rotatably held by the gear first holding part 71H of the first holding member 7H1 (integrally structured with the first fitted and held part 75H).

Figure 8:
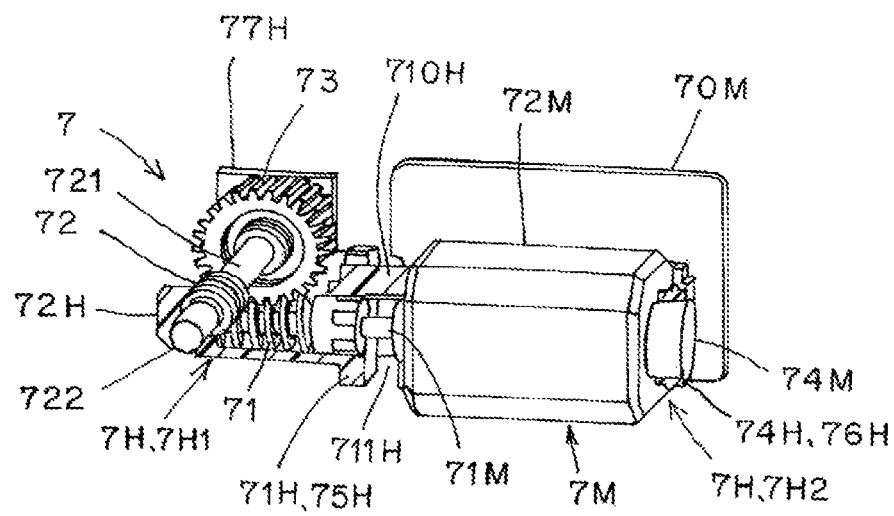
FIG. 8 is a partial cross-sectional perspective view (of the holding member) illustrating a state obtained when the motor, the deceleration mechanism, and the holding member of the electric retraction unit are assembled.
Figure 9:
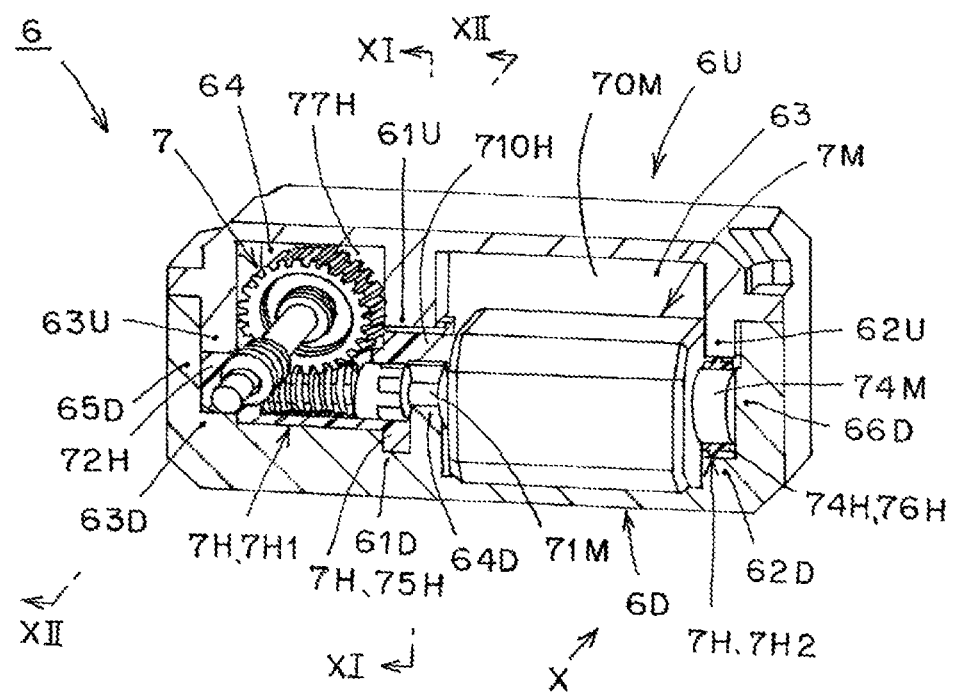
FIG. 9 is a partial cross-sectional perspective view (of the holding member and casings) illustrating a state obtained when the motor, the deceleration mechanism, and the holding member of the electric retraction unit are assembled to a casing.

As described above, the holding member 7H, the motor 7M, and the deceleration mechanism 7 are integrally assembled as illustrated in FIG. 8.

(Description of Assembly of Integrated Unit including Holding Member 7H, Motor 7M, and Deceleration Mechanism 7, and Lower Casing 6D)

Assembly of an integrated unit including the holding member 7H, the motor 7M, and the deceleration mechanism 7, and the lower casing 6D will be described below with reference to FIGS. 9 to 12.

Firstly, the lower casing 6D is assembled with the shaft 3, the washer 65, the rotational force transmission mechanism 9, the spring 90, and the stopper 9S.

Next, the clutch mechanism 8 is assembled. That is, as illustrated in FIG. 6, the clutch shaft 80, the first clutch gear 81, the second clutch gear 82, the clutch 86, the washer 83, the clutch spring 84, and the C ring 85 are assembled. The clutch mechanism 8 is assembled to the lower casing 6D.

The motor 7M is further assembled with the first worm gear 71 of the deceleration mechanism 7. The motor 7M and the first worm gear 71 of the deceleration mechanism 7 are assembled into the first holding member 7H1 of the holding member 7H.

Thereafter, the helical gear 73 of the deceleration mechanism 7 and the second worm gear 72 thereof are assembled into the motor 7M, the first worm gear 71 of the deceleration mechanism 7, and the first holding member 7H1 of the holding member 7H.

Next, the second holding member 7H2 of the holding member 7H and the switch circuit board 70M are assembled into the motor 7M, the deceleration mechanism 7, and the first holding member 7H1 of the holding member 7H.

The motor 7M, the deceleration mechanism 7, the holding member 7H, and the circuit board 70M are further assembled into the lower casing 6D.

Next, the upper casing GU and the above-described lower casing 6D are assembled. As a result, the electric retraction unit 6 is assembled.

Description of Operation of Embodiment

The electric retraction unit 6 and the electrically retractable peripheral visibility device for a vehicle 1 according to the present embodiment are configured as described above, and the operation will be described below.

(Description of Electric Rear Retraction)

When the visibility assembly 4 is located at the use position A illustrated in FIG. 3, the drive shaft 71M of the motor 7M is rotated forwardly (or reversely). Next, the rotational force of the drive shaft 71M is transmitted to the casings 6U and 6D via the deceleration mechanism 7, the clutch mechanism 8, and the rotational force transmission mechanism 9.

The visibility assembly 4 electrically rotates from the use position A to the rear retraction position B. When the visibility assembly 4 is located at the rear retraction position B illustrated in FIG. 3, due to at least one of the operation of the stopper mechanism or the operation of the retraction operation range regulation mechanism, the rotation of the visibility assembly 4 is stopped.

Next, the motor 7M stalls, a lock current flows, a torque of the motor 7M is output as a maximum torque, due to the operation of the switch circuit board 70M, the rotation of the motor 7M is stopped, and the visibility assembly 4 is stopped and located at the rear retraction position B.

(Description of Electric Return to Use position)

When the visibility assembly 4 is located at the rear retraction position B, the drive shaft of the motor 7M is rotated reversely (or rotated forwardly). Next, the rotational force of the drive shaft 71M is transmitted to the casings 6U and 6D via the deceleration mechanism 7, the clutch mechanism 8, and the rotational force transmission mechanism 9.

The visibility assembly 4 electrically rotates from the rear retraction position B to the use position A. When the visibility assembly 4 is located at the use position A illustrated in FIG. 3, due to the operation of the stopper mechanism, the rotation of the visibility assembly 4 is stopped.

Next, the motor 7M stalls, a lock current flows, a torque of the motor 7M is output as a maximum torque, due to the operation of the switch circuit board 70M, the rotation of the motor 7M is stopped, and the visibility assembly 4 is stopped and located at the use position A.

(Description of Manual Rotation)

It is possible to manually rotate the visibility assembly 4 located at the use position A to a rear E of the vehicle V. It is also possible to manually rotate the visibility assembly 4 located at the rear retraction position B to return back to the use position A.

It is further possible to manually rotate the visibility assembly 4 located at the use position A to a front F of the vehicle V. It is still further possible to manually rotate the visibility assembly 4 located at the front retraction position C to return back to the use position A.

Description of Effect of Embodiment

The electric retraction unit 6 and the electrically retractable peripheral visibility device for a vehicle 1 according to the present embodiment are based on the above-described configuration and effect, and the effect will be described below.

In the electric retraction unit 6 and the electrically retractable peripheral visibility device for a vehicle 1 according to this embodiment, the motor 7M and the deceleration mechanism 7 are held by the casings 6U and 6D higher in stiffness than the holding member 7H via being held by the holding member 7H being the elastic member. This allows the electric retraction unit 6 and the electrically retractable peripheral visibility device for a vehicle 1 according to this embodiment to smoothly rotate the pivot body (the electric retraction unit 6, the visibility assembly 4) in a stable state.

Moreover, in the electric retraction unit 6 and the electrically retractable peripheral visibility device for a vehicle 1 according to the present embodiment, the first receiving part 64D of the lower casing 6D inserted into the insertion hole 711H of the holding member 7H receives the thrust load of the first shaft part 711 of the first worm gear 71 on the motor 7M side. This allows the electric retraction unit 6 and the electrically retractable peripheral visibility device for a vehicle 1 according to this embodiment to even smoothly rotate the pivot body (the electric retraction unit 6, the visibility assembly 4) in a stable state without the motor 7M receiving a burden (load).

Further, the electric retraction unit 6 and the electrically retractable peripheral visibility device for a vehicle 1 according to this embodiment are structured so that the holding member 7H is provided with the insertion hole 711H while the lower casing 6D is provided with the first receiving part 64D, and thus, no special components are required. That is, in the electric retraction unit 6 and the electrically retractable peripheral visibility device for a vehicle 1 according to the present embodiment, it is possible to smoothly rotate the pivot body (the electric retraction unit 6 and the visibility assembly 4) in a stable state without a need to increase the number of components and a manufacturing cost.

In the electric retraction unit 6 and the electrically retractable peripheral visibility device for a vehicle 1 according to the present embodiment, the tubular parts 73M and the end cap part 74M at the both ends of the motor 7M are fitted and held to the motor first fitting and holding part 73H and the motor second fitting and holding part 74H of the holding member 7H, respectively, via the first rib 78H. As a result, the electric retraction unit 6 and the electrically retractable peripheral visibility device for a vehicle 1 according to the present embodiment, due to the crushing effect at the time of the assembling of the first rib 78H, a variation in dimensional tolerance between the motor 7M and the holding member 7H is absorbed to enable the motor 7M to be held (fixed) to the holding member 7H without a backlash.

In addition, in the electric retraction unit 6 and the electrically retractable peripheral visibility device for a vehicle 1 according to the present embodiment, the first fitted and held part 75H and the second fitted and held part 76H of the holding member 7H are fitted to and held by the first fitting and holding parts 61U and 61D and the second fitting and holding parts 62U and 62D of the casings 6U and 6D, respectively, via the second rib 79H. As a result, in the electric retraction unit 6 and the electrically retractable peripheral visibility device for a vehicle 1 according to the present embodiment, it is possible to absorb the variation in dimensional tolerance between the holding member 7H and the casings 6U and 6D, due to the crushing effect at the time of assembling the second rib 79H, to enable the holding member 7H to be held (fixed) to the casings 6U and 6D without a backlash.

As a result, in the electric retraction unit 6 and the electrically retractable peripheral visibility device for a vehicle 1 according to the present embodiment, it is possible to hold (fix) the tubular parts 73M and the end cap part 74M at the both ends of the motor 7M to the casings 6U and 6D via the holding member 7H without a backlash to prevent the motor 7M from tilting.

The electric retraction unit 6 and the electrically retractable peripheral visibility device for a vehicle 1 according to the present embodiment, the first shaft part 711 and the second shaft part 712 of the first worm gear 71 of the deceleration mechanism 7 are rotatably held by the gear first holding part 71H and the gear second holding part 72H of the holding member 7H, respectively, with a minimum required clearance. As a result, in the electric retraction unit 6 and the electrically retractable peripheral visibility device for a vehicle 1 according to the present embodiment, the degree of freedom is secured between the second shaft part 712 of the first worm gear 71 and the gear second holding part 72H of the holding member 7H.

As a result, in the electric retraction unit 6 and the electrically retractable peripheral visibility device for a vehicle 1 according to the present embodiment, it is possible to maintain (hold) a distance between a first worm gear 71 axis and a second worm gear 72 axis of the deceleration mechanism 7 (axial distance). This allows the electric retraction unit 6 and the electrically retractable peripheral visibility device for a vehicle 1 according to this embodiment to smoothly rotate the pivot body (the electric retraction unit 6, the visibility assembly 4) in a stable state.

In addition, in the electric retraction unit 6 and the electrically retractable peripheral visibility device for a vehicle 1 according to the present embodiment, the gear second holding part 72H of the holding member 7H configured to rotatably hold the second shaft part 712 of the first worm gear 71 is fitted to and held by the third fitting and holding parts 63U and 63D of the casings 6U and 6D, without passing through the second rib 79H. As a result, in the electric retraction unit 6 and the electrically retractable peripheral visibility device for a vehicle 1 according to the present embodiment, it is possible to surely secure the degree of freedom between the second shaft part 712 of the first worm gear 71 and the gear second holding part 72H of the holding member 7H to surely maintain (hold) a distance between the first worm gear 71 axis and the second worm gear 72 axis of the deceleration mechanism 7 (axial distance).

In the electric retraction unit 6 and the electrically retractable peripheral visibility device for a vehicle 1 according to the present embodiment, the gear first holding part 71H, the gear second holding part 72H, and the motor first fitting and holding part 73H of the holding member 7H are configured of one component (first holding member 7H1), and form a hollow tubular shape in which the first worm gear 71 of the deceleration mechanism 7, the drive shaft 71M and the tubular part 73M of the motor 7M are housed. As a result, in the electric retraction unit 6 and the electrically retractable peripheral visibility device for a vehicle 1 according to the present embodiment, the structure of the holding member 7H is simple, and thus, a mold structure is easy, and as a result, it is possible to reduce a manufacturing cost.

In addition, in the electric retraction unit 6 and the electrically retractable peripheral visibility device for a vehicle 1 according to the present embodiment, one component (first holding member 7H1) has a tubular shape, and thus, it is possible to maintain a grease reservoir such as a lubricant in the first worm gear 71 for a long period of time.

In addition, in the electric retraction unit 6 and the electrically retractable peripheral visibility device for a vehicle 1 according to the present embodiment, the motor first fitting and holding part 73H configured to fit and hold the tubular part 73M of the motor 7M, and the gear first holding part 71H and the gear second holding part 72H configured to rotatably hold the first shaft part 711 and the second shaft part 712 of the first worm gear 71 are the one same component and manufactured by the one same mold. As a result, in the electric retraction unit 6 and the electrically retractable peripheral visibility device for a vehicle 1 according to the present embodiment, it is possible to suppress axial misalignment of the deceleration mechanism 7 and the motor 7M held by the holding member 7H compared to a holding member (not illustrated) formed of a plurality of components and manufactured by a plurality of molds, and thus, it is less likely to be affected by a stacking tolerance of a plurality of components.

In addition, in the electric retraction unit 6 and the electrically retractable peripheral visibility device for a vehicle 1 according to the present embodiment, a mold used for molding one tubular component (first holding member 7H1) has basically a simple tubular shape opening in the axial direction. As a result, in the electric retraction unit 6 and the electrically retractable peripheral visibility device for a vehicle 1 according to the present embodiment, it is possible to mold one tubular component (first holding member 7H1) of the holding member 7H by an inexpensive mold having a simple structure.

In the electric retraction unit 6 and the electrically retractable peripheral visibility device for a vehicle 1 according to the present embodiment, the first shaft part 721, that is, the shaft part of the second worm gear 72 rotatably held by the casings 6U and 6D is rotatably fitted and held into the circular through hole 770H of the pair of gear fitting and holding parts 77H of the holding member 7H in a state where positional displacement is less likely to occur. As a result, in the electric retraction unit 6 and the electrically retractable peripheral visibility device for a vehicle 1 according to the present embodiment, it is possible to surely maintain (hold) a distance between the first worm gear 71 axis and the second worm gear 72 axis of the deceleration mechanism 7 (axial distance).

In the electric retraction unit 6 and the electrically retractable peripheral visibility device for a vehicle 1 according to the present embodiment, as illustrated in FIG. 17(A), in a plan view from top to bottom, the clutch mechanism 8 is arranged between the rotational force transmission mechanism 9 (including the shaft 3 and the stopper 9S) and the motor 7M, and the arrangement direction H of the rotational force transmission mechanism 9, the clutch mechanism 8, and the motor 7M intersects with the axial direction G of the drive shaft 71M of the motor 7M. As a result, an amount of protrusion (dimension in the left-right direction in FIG. 1) of the electric retraction unit 6 and the electrically retractable peripheral visibility device for a vehicle according to the present embodiment is smaller than the electric retraction unit and the electrically retractable peripheral visibility device for a vehicle arranged as illustrated in FIG. 17(B).

It is noted that the arrangement illustrated in FIG. 17(B) is achieved by arranging the clutch mechanism 8 between the rotational force transmission mechanism 9 (including the shaft 3 and the stopper 9S) and the second worm gear 72 of the deceleration mechanism 7 and placing the arrangement direction H of the rotational force transmission mechanism 9, and the clutch mechanism 8 and the second worm gear 72 of the deceleration mechanism 7 in parallel to the axial direction G of the drive shaft 71M of the motor 7M.

In the electric retraction unit 6 and the electrically retractable peripheral visibility device for a vehicle 1 according to the present embodiment, the motor 7M, the deceleration mechanism 7, the clutch mechanism 8, and the rotational force transmission mechanism 9 are arranged in a direction intersecting with (direction orthogonal to or substantially orthogonal to) the axial direction of the shaft 3 (rotation center line 0 direction). As a result, in the electric retraction unit 6 and the electrically retractable peripheral visibility device for a vehicle 1 according to the present embodiment, it is possible to decrease a dimension in the axial direction (rotation center line 0 direction) (dimension in the up-down direction) of the electric retraction unit 6 and the shaft 3 of the visibility assembly 4.

In the electric retraction unit 6 and the electrically retractable peripheral visibility device for a vehicle 1 according to the present embodiment, when the axial direction G of the drive shaft 71M of the motor 7M is intersected with the axial direction of the shaft 3, it is possible to further decrease the dimension in the axial direction of the electric retraction unit 6 and the shaft 3 of the visibility assembly 4.

In the electric retraction unit 6 and the electrically retractable peripheral visibility device for a vehicle 1 according to the present embodiment, it is possible to decrease the amount of protrusion of the electric retraction unit 6 and the visibility assembly 4, and it is also possible to decrease the dimension in the axial direction of the electric retraction unit 6 and the shaft 3 of the visibility assembly 4 (rotation center line 0 direction) (dimension in the up-down direction) while it is possible to maintain the diameter of the shaft 3 as conventionally. As a result, in the electric retraction unit 6 and the electrically retractable peripheral visibility device for a vehicle 1 according to the present embodiment, it is possible to stably support the electric retraction unit 6 and the visibility assembly 4 to the shaft 3 against the up-down load.

The electric retraction unit 6 and the electrically retractable peripheral visibility device for a vehicle 1 according to the present embodiment are an imaging device configured to image a periphery of the vehicle V of the visibility unit 5, and thus, it is possible to surely decrease the dimension of the housing 4H of the visibility assembly 4 housing the visibility unit 5 being the imaging device, together with the electric retraction unit 6, that is, the dimension in the axial direction of the shaft 3 of the visibility assembly 4 as compared to the outside mirror device using a mirror.

In the electric retraction unit 6 and the electrically retractable peripheral visibility device for a vehicle 1 according to the present embodiment, it is possible to display the image for the information on the rear and lateral sides of the vehicle V imaged by the visibility unit 5 being the imaging device, on the display devices 5M, 5ML, and 5MR. As a result, in the electric retraction unit 6 and the electrically retractable peripheral visibility device for a vehicle 1 according to the present embodiment, it is possible for a driver to visually recognize the image displayed on the display devices 5M, 5ML, and 5MR to visually recognize the rear and lateral sides of the vehicle V. As a result, in the electric retraction unit 6 and the electrically retractable peripheral visibility device for a vehicle 1 according to the present embodiment, it is possible to contribute to a traffic safely, similarly to the mirror.

Description of Modified Example of Holding Member 700H

Figure 18:
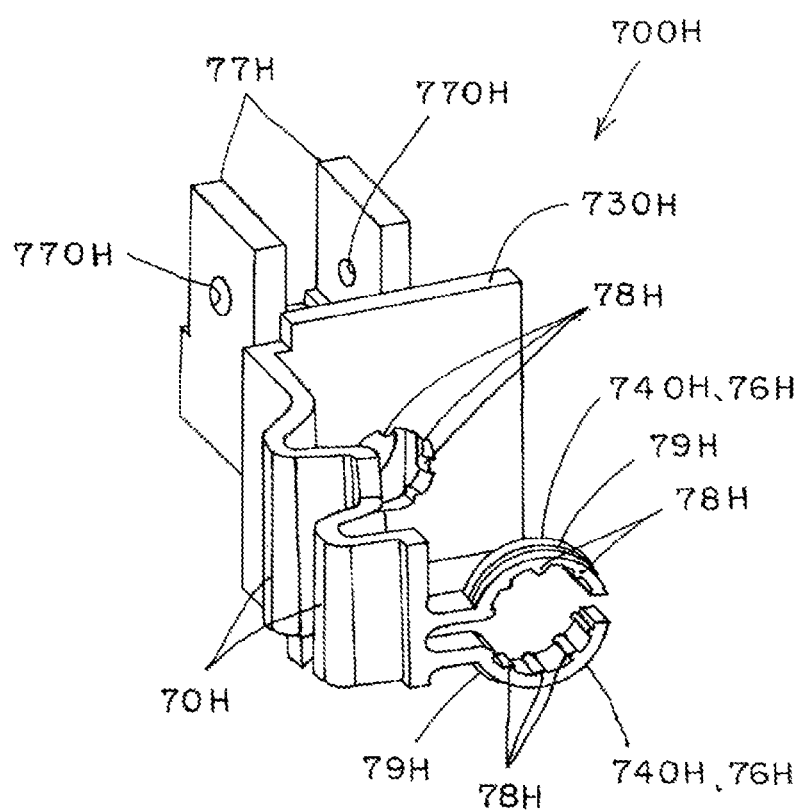
FIG. 18 is a perspective view illustrating a modified example of the holding member.

FIG. 18 illustrates a modified example of a holding member 700H. In the above-described holding member 7H (holding member 7H illustrated in FIGS. 1 to 17), the first holding member 7H1 and the second holding member 7H2 are separately manufactured. On the other hand, in the holding member 700H, the first holding member and the second holding member are integrally manufactured.

That is, a motor first fitting and holding part 730H and the pair of gear fitting and holding parts 77H on the first holding member side (including the gear first holding part 71H, the gear second holding part 72H, and the first fitted and held part 75H) and a motor second fitting and holding part 740H and the second fitted and held part 76H on the second holding member side are integrally connected via an elastic connection part 70H.

The motor first fitting and holding part 730H of the holding member 700H has a rectangular flat plate shape having a circular through hole at the center. It is noted that the motor first fitting and holding part 73H of the above-described holding member 7H has a cylindrical shape. The motor second fitting and holding part 740H (integrally structured with the second fitted and held part 76H) of the holding member 700H has two semicircular shapes. It is noted that the motor second fitting and holding part 74H of the above-described holding member 7H has a C shape obtained by cutting a part having the annular shape.

Description of Examples other than Embodiments

It is noted that the present invention is not limited by the above-described embodiment.

DESCRIPTION OF REFERENCE NUMERALS

1 Visibility device (electrically retractable peripheral visibility device for vehicle)
2 Base
21 First fixation part
22 Second fixation part
3 Shaft
30 Shaft part
31 Disk part
32 Fixation part
4 Visibility assembly
4H Housing
40 Through hole
5 Visibility unit
51 Lens
52 Harness
54 Image processing device
55, 56 Signal line
57 Detection device
5M, 5ML, 5MR Display device (monitor)
6 Electric retraction unit
6D Lower casing (gear case)
6U Upper casing (cover)
60 Screw
61 First accommodation concave part
62 Second accommodation concave part
63 Third accommodation concave part
64 Fourth accommodation concave part
65 Washer
66 Bearing part
69 Shaft part
60D Mounting part
61D First fitting and holding part
62D Second fitting and holding part
63D Third fitting and holding part
64D First receiving part (receiving part)
65D Second receiving part
66D Third receiving part
67D Fourth receiving part
60U Through hole
61U First fitting and holding part
62U Second fitting and holding part
63U Third fitting and holding part
7 Deceleration mechanism
71 First worm gear
711 First shaft part (shaft part)
712 Second shaft part
72 Second worm gear
721 First shaft part
722 Second shaft part
73 Helical gear
7H, 700H Holding member
7H1 First holding member
7H2 Second holding member
70H Elastic connection part
71H Gear first holding part (gear holding part)
710H Portion adjacent to gear first holding part 71H (portion between gear first holding part 71H and motor first fitting and holding part 7311)
711H Insertion hole
72H Gear second holding part
73H, 730H Motor first fitting and holding part
74H, 740H Motor second fitting and holding part
75H First fitted and held part
76H Second fitted and held part
77H Gear fitting and holding part
770H Through hole
78H First rib (motor rib)
79H Second rib (casing rib)
7M Motor
70M Switch circuit board
71M Drive shaft
72M Main body part
73M Tubular part
74M End cap part
8 Clutch mechanism
80 Clutch shaft
81 First clutch gear
82 Second clutch gear
83 Washer
84 Clutch spring
85 C ring
86 Clutch 9 Rotational force transmission mechanism
90 Spring
91 Lift gear
92 Lift holder
93 C ring
9S Stopper (stopper mechanism)
A Use position (first position)
B Rear retraction position (second position)
C Front retraction position
D Door (vehicle body)
E Rear of vehicle V
F Front of vehicle V
G Shaft direction (shaft direction of drive shaft 71M of motor 7M)
H Arrangement direction (arrangement direction of rotational force transmission mechanism 9, clutch mechanism 8, and motor 7M)
I Dimension
O Rotation center line (rotation center line of visibility assembly 4, center line of shaft part 30 of shaft 3)
O1 Axis (center line of clutch shaft 80)
V Vehicle
θB Rear rotation retraction angle
θC Front rotation retraction angle

The invention claimed is:

1. An electric retraction unit mounted on an electrically retractable peripheral visibility device for a vehicle, comprising:
a shaft fixed to a vehicle body via a base;
casings rotatably attached to the shaft; and
a motor, a deceleration mechanism, and a holding member accommodated in the casings,
wherein
the deceleration mechanism includes a gear having a shaft part being attached to a drive shaft of the motor,
the motor and the gear are held by the holding member,
the holding member is configured of an elastic member and held by the casings, and includes a gear holding part to rotatably hold the shaft part of the gear, and
the casings are configured by a member higher in stiffness than the holding member, and includes a receiving part to receive a thrust load of the shaft part of the gear on a side of the motor.

2. The electric retraction unit according to claim 1, wherein a portion adjacent to the gear holding part of the holding member is provided with an insertion hole into which a part of the casings is inserted.

3. The electric retraction unit according to claim 1, wherein the motor includes:
a main body part;
a tubular part provided on one surface of the main body part;
the drive shaft rotatably protruding from the tubular part; and
an end cap part provided on the other surface, on a side opposite to the one surface, of the main body part, and
the holding member includes:
a motor first fitting and holding part to fit and hold the tubular part from outside;
a motor second fitting and holding part to fit and hold the end cap part from outside; and
a plurality of motor ribs provided on an inner surface of the motor first fitting and holding part facing the tubular part and an inner surface of the motor second fitting and holding part facing the end cap part.

4. The electric retraction unit according to claim 1, wherein the gear of the deceleration mechanism has one end provided with a first shaft part of the shaft part and the other end provided with a second shaft part, and the first shaft part is attached to the drive shaft of the motor, and
the holding member includes a gear first holding part of the gear holding part to rotatably hold the first shaft part of the gear and a gear second holding part to rotatably hold the second shaft part of the gear.

5. The electric retraction unit according to claim 1, wherein the motor includes:
a main body part;
a tubular part provided on one surface of the main body part;
the drive shaft rotatably protruding from the tubular part; and
an end cap part provided on the other surface, on a side opposite to the one surface, of the main body part,
the gear of the deceleration mechanism has one end provided with a first shaft part of the shaft part and the other end provided with a second shaft part, and the first shaft part is attached to the drive shaft of the motor,
the holding member includes:
a motor first fitting and holding part to fit and hold the tubular part from outside;
a motor second fitting and holding part to fit and hold the end cap part from outside;
a plurality of motor ribs provided on an inner surface of the motor first fitting and holding part facing the tubular part and an inner surface of the motor second fitting and holding part facing the end cap part;
a gear first holding part of the gear holding part to rotatably hold the first shaft part of the gear; and
a gear second holding part to rotatably hold the second shaft part of the gear, and
the gear first holding part, the gear second holding part, and the motor first fitting and holding part of the holding member are configured of one component, and form a hollow tubular shape housing the gear, the drive shaft, and the tubular part.

6. The electric retraction unit according to claim 1, wherein the casings include a fitting and holding part to fit and hold the holding member, and
the holding member includes a fitted and held part fitted and held by the fitting and holding part and at least one casing rib provided on a surface of the fitted and held part facing the fitting and holding part.

7. The electric retraction unit according to claim 1, wherein the deceleration mechanism includes:
a first worm gear being the gear;
a second worm gear having a shaft part being rotatably held by the casings; and
an intermediate gear being fixed to the shaft part of the second worm gear and meshing with the first worm gear,
the holding member includes a pair of gear fitting and holding part arranged on both sides of the intermediate gear, and
the pair of gear fitting and holding parts are each provided with a circular through hole to rotatably fit and hold the shaft part of the second worm gear.

8. The electric retraction unit according to claim 1, comprising: a clutch mechanism being attached to the casings, the clutch mechanism being in an engaged state in normal times to transmit a rotational force of the motor to the casings via the deceleration mechanism, the clutch mechanism being in a disengaged state if a force larger than the rotational force transmitted from the motor is applied to the casings to not transmit the force from the casings to the deceleration mechanism and to rotate the casings;

a rotational force transmission mechanism being attached to the shaft, the rotational force transmission mechanism being to transmit the rotational force of the motor via the deceleration mechanism and the clutch mechanism to the casings to rotate the casings between a first position and a second position; and a stopper mechanism to stop the casings at each of the first position and the second position, wherein in a plan view from top to bottom, the clutch mechanism is arranged between the rotational force transmission mechanism and the motor, and an arrangement direction of the rotational force transmission mechanism, the clutch mechanism, and the motor intersects with a direction of the drive shaft of the motor.

9. An electrically retractable peripheral visibility device for a vehicle, comprising: the electric retraction unit according to claim 1;

a base fixed to a vehicle body;

a shaft of the electric retraction unit fixed to the base; and a visibility assembly rotatably attached to the shaft, wherein the visibility assembly includes:

a housing; and a visibility unit accommodated in the housing together with the electric retraction unit, and the visibility assembly is rotated by the electric retraction unit between a use position and a rear retraction position.

10. The electrically retractable peripheral visibility device for a vehicle according to claim 9, wherein the visibility unit is an imaging device to image a periphery of a vehicle.

11. The electrically retractable peripheral visibility device for a vehicle according to claim 10, comprising a display device mounted in the vehicle to display an image around the vehicle imaged by the imaging device.

* * * * *